(12) United States Patent
Peng et al.

(10) Patent No.: US 10,678,816 B2
(45) Date of Patent: Jun. 9, 2020

(54) SINGLE-ENTITY-SINGLE-RELATION QUESTION ANSWERING SYSTEMS, AND METHODS

(71) Applicant: RSVP TECHNOLOGIES INC., Waterloo (CA)

(72) Inventors: Zhongyu Peng, Waterloo (CA); Kun Xiong, Waterloo (CA); Anqi Cui, Waterloo (CA)

(73) Assignee: RSVP TECHNOLOGIES INC., Waterloo, ON (*) Notice: Subject to any disclaimer, the term of this patent is extended or adjusted under 35 U.S.C. 154(b) by 352 days.

(21) Appl. No.: 15/684,889

(22) Filed: Aug. 23, 2017

(65) Prior Publication Data

US 2019/0065576 A1 Feb. 28, 2019

(51) Int. Cl.
G06F 16/22 (2019.01)
G06F 16/28 (2019.01)
G06F 16/332 (2019.01)

(52) U.S. Cl.
CPC ......... *G06F 16/285* (2019.01); *G06F 16/22* (2019.01); *G06F 16/3329* (2019.01)

(58) Field of Classification Search
None
See application file for complete search history.

(56) References Cited

U.S. PATENT DOCUMENTS

2013/0326353 A1\* 12/2013 Singhal .................. G06F 3/167 715/728
2016/0283491 A1\* 9/2016 Lu ....................... G06F 16/3322
2018/0204136 A1\* 7/2018 Boxwell ................. G06N 5/04

OTHER PUBLICATIONS

Soren Auer, Christian Bizer, Georgi Kobilarov, Jens Lehmann, Richard Cyganiak, and Zachary Ives. Dbpedia: A nucleus for a web of open data. In The semantic web, pp. 722-735. Springer, 2007.
Michele Banko, Michael J Cafarella, Stephen Soderland, Matthew Broadhead, and Oren Etzioni. Open information extraction from the web. In IJCAI, vol. 7, pp. 2670-2676, 2007.
Jonathan Berant, Andrew Chou, Roy Frostig, and Percy Liang. Semantic parsing on freebase from question-answer pairs. In EMNLP, vol. 2, p. 6, 2013.
Jonathan Berant and Percy Liang. Semantic parsing via paraphrasing. In ACL (1), pp. 1415-1425, 2014.
Zhiping Zheng. Answerbus question answering system. In Proceedings of the second international conference on Human Language Technology Research, pp. 399-404. Morgan Kaufmann Publishers Inc., 2002.

(Continued)

*Primary Examiner* — Robert W Beausoliel, Jr.
*Assistant Examiner* — Hau Hoang

(57) ABSTRACT

Provided are systems and methods related to converting unlabeled data into structured and labeled data for answering one or more single-entity-single-relation questions. The systems and methods automates the labeling of data to generate training data for machine learning. The systems and methods identify and import question and answer pairs from an user generated discussion platform and access a knowledge base questions to extract questions by supervised extraction. The extracted questions are further filtered to remove mislabeled questions. When a question is posed, it is parsed for entity and relation, and an answer is identified by searching through the knowledge base.

27 Claims, 16 Drawing Sheets

(56) References Cited

OTHER PUBLICATIONS

Antoine Bordes, Sumit Chopra, and Jason Weston. Question answering with subgraph embeddings. arXiv preprint arXiv:1406.3676, 2014.
Antoine Bordes, Nicolas Usunier, Sumit Chopra, and Jason Weston. Large-scale simple question answering with memory networks. arXiv preprint arXiv:1506.02075, 2015.
Min Zhang, Jie Zhang, Jian Su, and Guodong Zhou. A composite kernel to extract relations between entities with both at and structured features. In Proceedings of the 21st International Conference on Computational Linguistics and the 44th annual meeting of the Association for Computational Linguistics, pp. 825-832. Association for Computational Linguistics, 2006.
Razvan C Bunescu and Raymond J Mooney. A shortest path dependency kernel for relation extraction. In Proceedings of the conference on human language technology and empirical methods in natural language processing, pp. 724-731. Association for Computational Linguistics, 2005.
Hang Cui, Renxu Sun, Keya Li, Min-Yen Kan, and Tat-Seng Chua. Question answering passage retrieval using dependency relations. In Proceedings of the 28th annual international ACM SIGIR conference on Research and development in information retrieval, pp. 400-407. ACM, 2005.
Martin Ester, Hans-Peter Kriegel, Jorg Sander, and Xiaowei Xu. A density-based algorithm for discovering clusters in large spatial databases with noise. In Kdd, vol. 96, pp. 226-231, 1996.
Dmitry Zelenko, Chinatsu Aone, and Anthony Richardella. Kernel methods for relation extraction. Journal of machine learning research, 3(Feb):1083-1106, 2003.
Anthony Fader, Luke S Zettlemoyer, and Oren Etzioni. Paraphrase-driven learning for open question answering. In ACL (1), pp. 1608-1618. Citeseer, 2013.
Wen-tau Yih, Xiaodong He, and Christopher Meek. Semantic parsing for single relation question answering. In ACL (2), pp. 643-648. Citeseer, 2014.
Zhou GuoDong, Su Jian, Zhang Jie, and Zhang Min. Exploring various knowledge in relation extraction. In Proceedings of the 43rd annual meeting on association for computational linguistics, pp. 427-434. Association for Computational Linguistics, 2005.
Wen-tau Yih, Ming-Wei Chang, Christopher Meek, and Andrzej Pastusiak. Question answering using enhanced lexical semantic models. 2013.
Yi Yang, Wen-tau Yih, and Christopher Meek. Wikiqa: A challenge dataset for open domain question answering. In Proceedings of EMNLP, pp. 2013-2018. Citeseer, 2015.
Mengqiu Wang. A re-examination of dependency path kernels for relation extraction. In IJCNLP, pp. 841-846, 2008.
Nanda Kambhatla. Combining lexical, syntactic, and semantic features with maximum entropy models for extracting relations. In Proceedings of the ACL 2004 on Interactive poster and demonstration sessions, p. 22. Association for Computational Linguistics, 2004.
Di Wang and Eric Nyberg. A long short-term memory model for answer sentence selection in question answering. ACL, Jul. 2015.
Cody Kwok, Oren Etzioni, and Daniel S Weld. Scaling question answering to the web. ACM Transactions on Information Systems (TOIS), 19(3):242-262, 2001.
Richard Socher, Brody Huval, Christopher D Manning, and Andrew Y Ng. Semantic compositionality through recursive matrix-vector spaces. In Proceedings of the 2012 Joint Conference on Empirical Methods in Natural Language Processing and Computational Natural Language Learning, pp. 1201-1211. Association for Computational Linguistics, 2012.
Yusuke Shinyama and Satoshi Sekine. Preemptive information extraction using unrestricted relation discovery. In Proceedings of the main conference on Human Language Technology Conference of the North American Chapter of the Association of Computational Linguistics, pp. 304-311. Association for Computational Linguistics, 2006.
Mike Mintz, Steven Bills, Rion Snow, and Dan Jurafsky. Distant supervision for relation extraction without labeled data. In Proceedings of the Joint Conference of the 47th Annual Meeting of the ACL and the 4th International Joint Conference on Natural Language Processing of the AFNLP: vol. 2—vol. 2, pp. 1003-1011. Association for Computational Linguistics, 2009.
Barbara Plank and Alessandro Moschitti. Embedding semantic similarity in tree kernels for domain adaptation of relation extraction. In ACL (1), pp. 1498-1507, 2013.

* cited by examiner

SINGLE-ENTITY-SINGLE-RELATION QUESTION ANSWERING SYSTEMS, AND METHODS

FIELD OF THE INVENTION

The invention relates to the field of Question Answering systems, and in particular to Single-Entity-Single-Relation Question Answering systems.

BACKGROUND

Wolfram Alpha™ is an answer engine developed by Wolfram Research. It can answer factual queries directly with answers from its structured knowledge bases. For example, query "Where's Canada's capital?" returns answer "Ottawa". It is used to power Siri™, intelligent personal assistant developed by Apple™, and S Voice™, counterpart developed by Samsung™.

Yet when asked the same question in another language, for example in Chinese, "加拿大的首都在哪里？ (Where's Canada's capital?)", Wolfram Alpha does not know how to interpret the question. Even Siri™, which supports the Chinese language, cannot answer the question and returns a list of search results from the Web instead. Accordingly, there is a need to build an open domain question answering (QA) system that can answer such questions in languages other than English.

SUMMARY OF THE INVENTION

Some embodiments of the present invention addresses the challenges facing existing systems for answering question inputs by a human. Natural language is highly variable, and for a system to provide useful or meaningful answers to questions, the system must be able account for or filter through the variations and output an appropriate reply.

For example, spoken language in particular is inherently variable and evolves over time. In some aspects, the systems described herein accounts for the evolution of language over time, and outputs an appropriate answer, for example, by recognizing patterns in the posed questions. In some embodiments, the system utilizes user generated content, such that training data reflects the evolving language used by people to input questions.

Some embodiments of the present invention also provide a system for answering questions that are inputted in languages other than English. Publicly available knowledge bases in languages other than English is very limited and/or expensive to produce. As such, existing systems for answering questions which rely on publicly available knowledge bases are limited in their functionalities, particularly when the inputted question is not in English. In some aspects, the systems described herein provides a more effective way of using the limited knowledge bases to output a more accurate answer to inputted questions that are not in English.

In one aspect, a question and answer system is provided for converting unlabeled data into structured and labeled data for answering one or more single-entity-single-relation questions, the system comprising: a non-transitory computer readable memory storing a library comprised of one or more data structures, each of the one or more data structures configured to store a plurality of extracted questions, wherein for each extracted question said library of one or more data structures comprises: a first field identifying an entity of the extracted question; a second field identifying a relation of the extracted question; and a third field containing the extracted question; and a processor configured to: identify and import question and answer pairs from an user generated discussion platform; access a knowledge base comprised of a plurality of relation triples, wherein each relation triple comprises: an entity field; a relation field; and a value field; store the question of each question and answer pair in the library: when the entity field of at least one of the plurality of relation triples appear in the question, when the corresponding value field of the at least one of the plurality of relation triples appear in the corresponding answer, and when the corresponding value field do not appear in the question, wherein the question is stored as an extracted question by storing the corresponding entity field as the first field, the corresponding relation field as the second field, and the corresponding question as the third field; and receive as input a data string representing a posed question and output an answer to the posed question based on the extracted questions from the library.

In another aspect, a method is provided for converting unlabeled data into structured and labeled data for answering one or more single-entity-single-relation questions, the method comprising the steps of: identifying and importing question and answer pairs from an user generated discussion platform; accessing a knowledge base comprised of a plurality of relation triples, wherein each relation triple comprises: an entity field; a relation field, and a value field; storing the question of each question and answer pair in a library: when the entity field of at least one of the plurality of relation triples appear in the question, when the corresponding value field of the at least one of the plurality of relation triples appear in the corresponding answer, and when the corresponding value field do not appear in the question, wherein the library comprises of one or more data structures, each of the one or more data structures configured to store a plurality of extracted questions, wherein for each extracted question said library of one or more data structures comprises: a first field identifying an entity of the extracted question, a second field identifying a relation of the extracted question, and a third field containing the extracted question, wherein the question is stored as an extracted question by storing the corresponding entity field as the first field, the corresponding relation field as the second field, and the corresponding question as the third field; and receiving as input a data string representing a posed question and output an answer to the posed question based on the extracted questions from the library.

In another aspect, a computer-readable medium is provided carrying out a method comprising: identifying and importing question and answer pairs from an user generated discussion platform; accessing a knowledge base comprised of a plurality of relation triples, wherein each relation triple comprises: an entity field; a relation field, and a value field; storing the question of each question and answer pair in a library: when the entity field of at least one of the plurality of relation triples appear in the question, when the corresponding value field of the at least one of the plurality of relation triples appear in the corresponding answer, and when the corresponding value field do not appear in the question, wherein the library comprises of one or more data structures, each of the one or more data structures configured to store a plurality of extracted questions, wherein for each extracted question said library of one or more data structures comprises: a first field identifying an entity of the extracted question, a second field identifying a relation of the extracted question, and a third field containing the extracted question, wherein the question is stored as an extracted question by storing the corresponding entity field as the first field, the corresponding relation field as the second field, and the corresponding question as the third field; and receiving as input a data string representing a posed question and output an answer to the posed question based on the extracted questions from the library.

BRIEF DESCRIPTION OF THE FIGURES

A detailed description of the preferred embodiments is provided herein below by way of example only and with reference to the following drawings, in which.

DETAILED DESCRIPTION

Figure 1A:
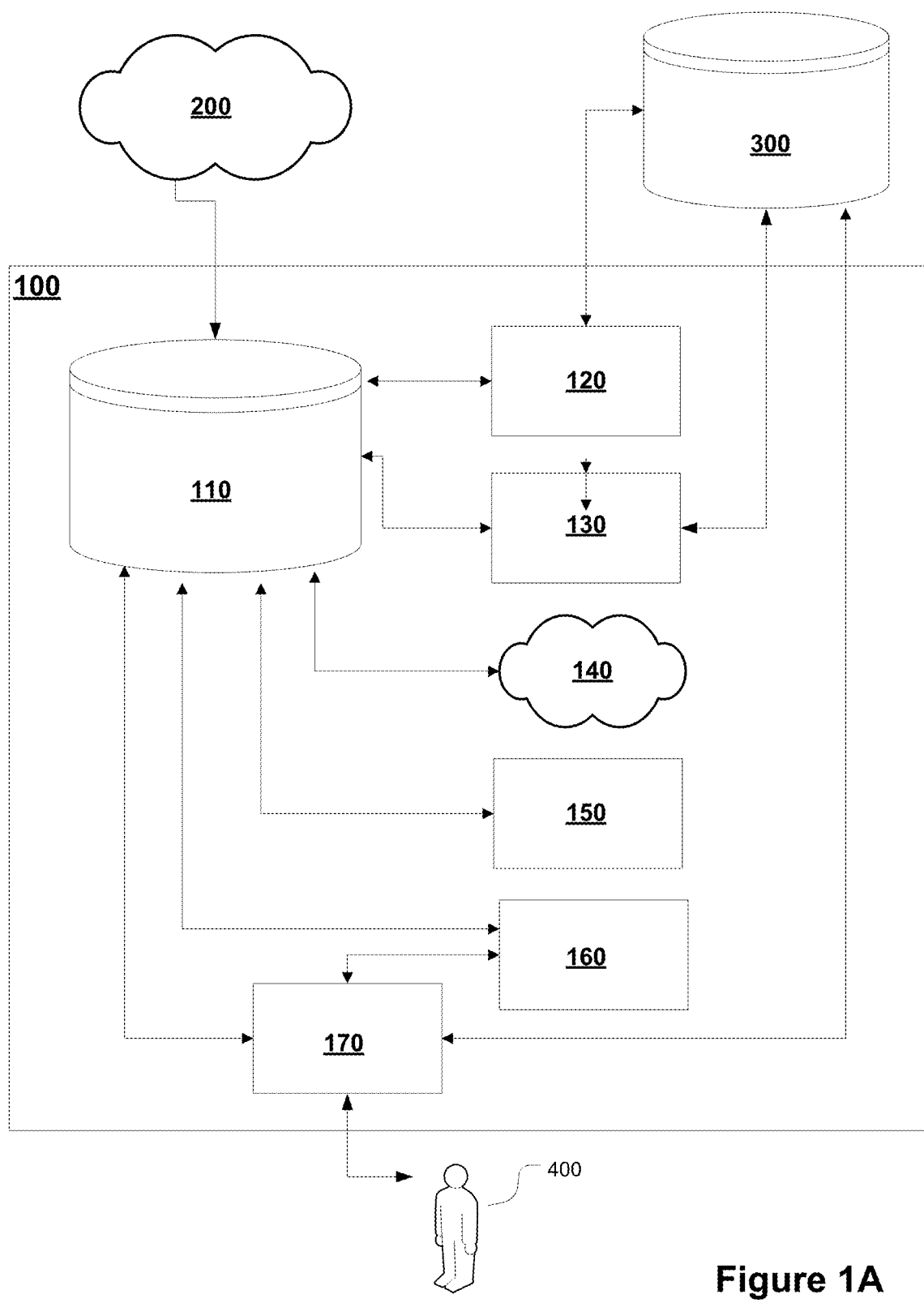
FIG. 1A is a schematic diagram outlining an embodiment of a system for answering single-entity-single-relation questions.

Automatic QA systems that return the direct and exact answers to natural language questions have been in the limelight of research since 1960s and 1970s (e.g., Baseball (Green Jr et al., 1961), Lunar (Woods et al., 1977)). Though early systems are limited to closed-domains due to lack of knowledge sources, recently there has been huge growth in open-domain systems since the development of large scale knowledge bases, such as DBpedia (Auer et al., 2007), Freebase (Bollacker et al., 2008), ReVerb (Fader et al., 2011), and Yago2 (Hoffart et al., 2013) in the past decade. The advent of publicly available large scale datasets, such as webpage collection ClueWeb09 with about 1 billion webpages, WikiAnswers questions paraphrases (Fader et al., 2013) with 18 million paraphrase pairs, and annotated QA pairs SimpleQuestions (Bordes et al., 2015) with 108,442 labeled questions, further facilitates the development of automatic QA systems.

Despite current research on QA systems, few works on QA in the Chinese language are known. One of the main reason is lack of data to work on. For example, the only publicly available knowledge bases with a Chinese version is DBpedia™ (Auer et al., 2007). This applies to other non-English languages as well. In one embodiment of a question-answering system, the system builds a library of relations by parsing questions that are labeled for machine learning. To generate this library, questions from two sources are used: community question answering websites and knowledge bases. The system is configured to identify and extract pairs of questions and answers based on pattern recognition and is supervised by knowledge bases. The system further configured to filter noise to remove mislabeled questions, such that the library comprises correctly structured data for use as machine learning training data.

Collecting training data is a major challenge when building a non-English machine learning system. Another major challenge is the variation present in languages, as the same question can be phrased in various different forms. Therefore, the correctness with which language structures are labeled and the quantity of the training data available directly impact the system performance. However, quality data is often hard to come by, because hand-labeled corpora is expensive to produce and therefore limited in quantity. This is especially a problem when focusing on languages such as the Chinese language, as labeled Chinese corpora is very scarce.

Question Answering

Studies have been done on question answering. Approaches fall into two categories: information retrieval based systems (Bordes et al., 2014; Bordes et al., 2015; Cui et al., 2005; Heilman et al., 2010; Wang et al., 2015; Yih et al., 2013) which retrieve candidate documents and then analyze them to obtain answers, and semantic parsing based systems (Berant et al., 2013; Berant et al., 2014; Kwiatkowski et al., 2010; Yah et al., 2014; Zettlemoyer et al., 2007; Zettlemoyer et al., 2012) which parse natural language questions into logical forms and lookup knowledge bases for answers.

Information retrieval based systems retrieve candidate documents and then analyze them to obtain answers. Early systems, such as AnswerBus™ (Zheng, 2002) and MULDER™ (Kwok et al., 2001), use features from questions to generate queries for Web search engines (e.g., Google, Yahoo), retrieve short passages, extract answer candidates, and rank answers. The key to good results is query generation and answer ranking. For example, MULDER™ would generate additional query by replacing the adjective in the question with its attribute noun, and pick the best candidate answer by clustering and voting. Current approaches for answer selection include syntactic analysis (e.g., tree-edit distance based tree matching method, tree kernel function together with logistic regression model with syntactic features of edit sequences (Heilman et al., 2010)), lexical semantic model (e.g., pairing semantically related words based on word relations (Yih et al., 2013)), and deep learning neural networks (e.g., stacked bidirectional long short-term memory network with keyword matching (Wang et al., 2015), embedding model that embeds questions and corresponding answers close to each other (Bordes et al., 2014)).

Jacana-freebase (Yao et al., 2014) is one of the state-of-the-art information retrieval-based systems. It uses Freebase Search API to retrieve topic graphs from Freebase (Bollacker et al., 2008) as candidate documents. It converts the dependency parse of the question into a feature graph and uses rules to extract question features. Also it uses relations and properties of nodes in retrieved topic graphs as knowledge base features. To rank candidate questions, it feeds the extracted question features and the extracted knowledge base features to a binary classifier that outputs correct or incorrect.

Semantic parsing based systems work together with knowledge bases. They parse natural language questions into logical forms and lookup knowledge bases for answers. Generally, to answer a question, they decompose questions, map phrases to knowledge base items (e.g., entities, relations, queries), generate knowledge base queries, pick the top ranked query, and retrieve the answer. Early efforts (Kwiatkowski et al., 2010; Zettlemoyer et al., 2007; Zettlemoyer et al., 2012) train the parser with English sentences paired with manually annotated logical forms as supervision, while recent works (Berant et al., 2013; Berant et al., 2014) use question-answer pairs as weak supervision to avoid the expensive manual annotation.

Inspired by PARALEX™, Yih et al. (Yih et al., 2014) built a system that matches natural language patterns with database items via a semantic similarity function instead of a lexicon, from the same data that PARALEX™ uses. At the core of the system is a semantic similarity model based on convolutional neural networks trained on the WikiAnswers™ paraphrases. Given a question, the system decomposes it into two disjoint parts, an entity mention and a relation pattern, by enumerating all possible combinations. The combinations are fed into the semantic similarity model, mapped to database entity and database relation, and scored. The system then looks up the ReVerb™ database with the entity and the relation and returns the result as answer.

Adopting an existing method poses challenges, such as the lack of data to operate on. For example, neither Freebase™ (Bollacker et al., 2008) nor ClueWeb09™ has Chinese versions, and paraphrases of questions (Fader et al., 2013) similar to that of WikiAnswers are also difficult to obtain as users on Chinese community QA sites do not have the option of tagging similar questions. Moreover, manually annotated QA pairs such as SimpleQuestions (Bordes et al., 2015) not only are in English only, but are also costly to produce.

Relation Extraction

Relation extraction aims to detect and classify relations between named entities or marked nominals. It plays a key role in question answering by parsing and classifying natural language questions in the form of relations between named entities. It is considered as a supervised multi-class classification task. Most supervised methods can be categorized into feature-based methods, kernel-based methods, and deep learning neural network-based methods.

Feature-based methods extract various kinds of linguistics features and feed them into multi-class classifiers (e.g., max entropy model (Kambhatla, 2004), SVM (GuoDong et al., 2005)). Handcrafted features include lexical features (e.g., entities, part-of-speech tags of entities), syntactic features (e.g., parse trees), and semantic features (e.g., concept hierarchy, entity class).

Kernel-based methods explore structural features by using similarity measure (kernel function). Zelenko et al. (Zelenko et al., 2003), one of the earliest works, use a tree kernel that computes the similarity of shallow parse trees by a weighted sum of common subtrees. Later, Bunescu et al. (Bunescu et al., 2005) use a kernel function that makes use of the shortest dependency path between two entities. Furthermore, Zhang et al. (Zhang et al., 2006) uses a composite kernel: a combination of a tree kernel and a lexical feature kernel. Similarly, Wang (Wang, 2008) introduces syntactic features into the kernel function, and Plank et al. (Plank et al., 2013) introduces semantic features.

Neural-network-based methods learn the underlying features automatically. Socher et al. (Socher et al., 2012) proposed a matrix-vector recursive neural network that assigns matrix-vector representation to parse tree nodes and learns compositional vector representations for phrases and sentences. Zeng et al. (Zeng et al., 2014) learn sentence-level features via a convolutional neural network, extract lexical features, and combine them for classification.

Aside from supervised methods that require costly manual labeling, unsupervised approaches (Banko et al., 2007; Shinyama et al., 2006) extract and cluster sequences of words between entity mentions from a large textual corpus. Compared to supervised methods, results from unsupervised methods do not have clear labels associated with each relation. To counter this issue, distant supervision (Mintz et al., 2009) uses known relations from knowledge bases to guide the extraction from a large textual corpus. The assumption is that if two entities are known to have a known relation in a knowledge base, then any sentence that mentions these entities expresses the relation in some way.

Mintz et al. (Mintz et al., 2009) experimented on Freebase to extract relations from Wikipedia. Given two entities, the system extracts features from sentences that contain the two entities, aggregate the features into a single feature vector, and feeds it into a multi-class logistic regression classifier. The extracted features include: lexical features (e.g., part-of-speech tags of entities, sequence of words between entities), syntactic features (e.g., dependency path between entities), and named entity tag features.

Question Answer (QA) System Embodiments

In one embodiment, the question and answer system is configured to provide answers to single-entity-single-relation questions. To be able to answer such questions, the system is configured to first collect machine learning training data by semantically parsing and identifying relations in questions obtained from community question answer sources. Since data from community question answer sources is unstructured, the system is configured to use structured data from knowledge bases as a guide to automate the labeling of QA pairs from community question answer sources. The system is language independent and is based on a model of simplifying representation used in natural language processing and information retrieval. In this model, a text (such as a sentence or a document) is represented as a bag (multiset) of its words, disregarding grammar and even word order but keeping multiplicity. An embodiment of the question and answer system is illustrated in FIG. 1A.

In some embodiments, a "question answering system" is a computer system that automatically answers questions inputted by humans in a natural language. For example, Siri™. In some embodiments, semantic parsing based question answering systems, such systems parse natural language questions into logical forms or relations and lookup knowledge bases for answers to the posed questions. In some embodiments, the system is trained on data comprising structured and labeled data. In other embodiments, the system converts unlabeled data into structured and/or labeled data for training the system to answer questions, including single-entity-single-relation questions. In preferred embodiments, the conversion of unlabeled data into structured and/or labeled data is performed by supervised by machine labeling. In most preferred embodiments the conversion is performed automatically, or semi-automatically.

In one embodiment, the system receives a posed question as input from an input device. Examples of input devices include, but are not limited to: a microphone, a keyboard, a touchscreen, or a mouse. Where the input is in audio format, a speech recognition application and/or module is configured to convert the audio format into text or word strings; or to recognize words from the audio input and convert the words into text or word strings. The system further outputs an answer to a posed question through an output device. Examples of output devices include, but are not limited to: a speaker, a display, a speech output system, a printer. In some embodiments, the system output is a text or word strings, which are converted into audio and/or video format. In other embodiments, a text or word string output is converted into an image file for display on a display screen.

As used herein, a "single-entity-single-relation question" refers to a question that is paired to an answer by an associated "entity-relation-value triple" or a "relation triple". A "triple" refers to a semantic triple. A triple is a set of three data that codifies a statement about semantic data (for example, "Bob" is the entity, "age" is the relation, and "35" is the value). This format enables knowledge to be represented in a machine-readable way. A question and answer pair (QA pair) associated with this example triple can be, for example: "How old is Bob?" and "Bob just turned 35". Applied to a non-English language, questions such as "NSA的总部在哪里？ (Where's NSA's headquarters?)" and "奥巴马什么时候出生的？ (When was Obama born?)" are examples of single-entity-single-relation questions. This type of questions are a subset of factoid questions and is observed to be the most common type of questions in various community QA sites (Fader et al., 2013).

As used herein, an "entity" represents the subject of a statement or question, or refers to data (in the form of, for example, text or word strings, or numerical identifiers corresponding to word position in a sentence, or links or tags to words in a sentence) identifying the subject of a statement or question. For example, a subject of a statement includes: a person, place, organizations, objects, or names. As used herein, a "relation" represents the semantic pattern of a statement or question, or refers to data (in the form of, for example, text or word strings, or numerical identifiers corresponding to word position in a sentence, or links or tags to words in a sentence) identifying the semantic pattern of a statement or question. For example, a semantic pattern of a statement or question can be about the age, population, colour, size, time, location, etc of the subject of the statement or question. As used herein, a "value" represents the answer value of a statement or a question, or refers to data (in the form of, for example, text or word strings, or numerical identifiers corresponding to word position in a sentence, or links or tags to words in a sentence) identifying the answer value of a statement or question. The answer value presents data or information about the subject of a statement or question, based on a semantic pattern.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers may be a server, network appliance, set-top box, embedded device, computer expansion module, personal computer, laptop, personal data assistant, cellular telephone, smartphone device, UMPC tablets and wireless hypermedia device or any other computing device capable of being configured to carry out the methods described herein.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Each program may be implemented in a high level procedural or object oriented programming or scripting language, or both, to communicate with a computer system. However, alternatively the programs may be implemented in assembly or machine language, if desired. The language may be a compiled or interpreted language. Each such computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer usable instructions may also be in various forms, including compiled and non-compiled code.

Data Collection

The QA system generates machine learning training data from two sources of data. The first source data is structured data from knowledge bases, containing accurate knowledge facts. The second source of data is unstructured data from community question and answer sources, from which a greater varieties of questions can be obtained. In contrast, existing methods only utilize structured data.

To start, the system gathers training data to supplement the limited availability of public knowledge bases. Community question answer (community QA) sources 200 are resorted to (for example community QA websites), to obtain a large corpus of QA pairs. Using community QA sources also provides the added advantage of allowing for the system to account for word choice variations in the question and/or answer which are not captured in knowledge bases. In the example of the Chinese language, after scraping community QA websites in China, in one embodiment the system has collected about 260 million QA pairs.

As used herein, a "knowledge base" refers to a technology used to store complex structured and unstructured information organized in a form that facilitates used and analysis by a computer system, such as in the form of relation triples. It encompasses the underlying set of facts, assumptions, and rules that a computer system has available and can draw upon to solve a problem. Examples include, but are not limited to DBpedia, Freebase, ReVerb, and Yago2.

For example, in some embodiments, a knowledge base comprises one or more a data storage devices or memories storing structured and/or unstructured information as described herein or otherwise. In some embodiments, a knowledge base can be provided locally or can be accessed over a network (e.g. a server hosting the knowledge base).

As used herein, a "community question answer" (community QA) refers to a collection of questions and answers generated by users submitting and answering questions on a platform. For example, community QA is obtained from an online platform, and preferably from an online forum. Examples of community QA sources include but are not limited to WikiAnswers™, or Quora™. In some embodiments, community QAs can be stored in a database or library. In some embodiments, community QA databases can be generated using bot to access, crawl and/or scrape QA data from one or more websites, networked servers, or any other resource.

Figure 1B:
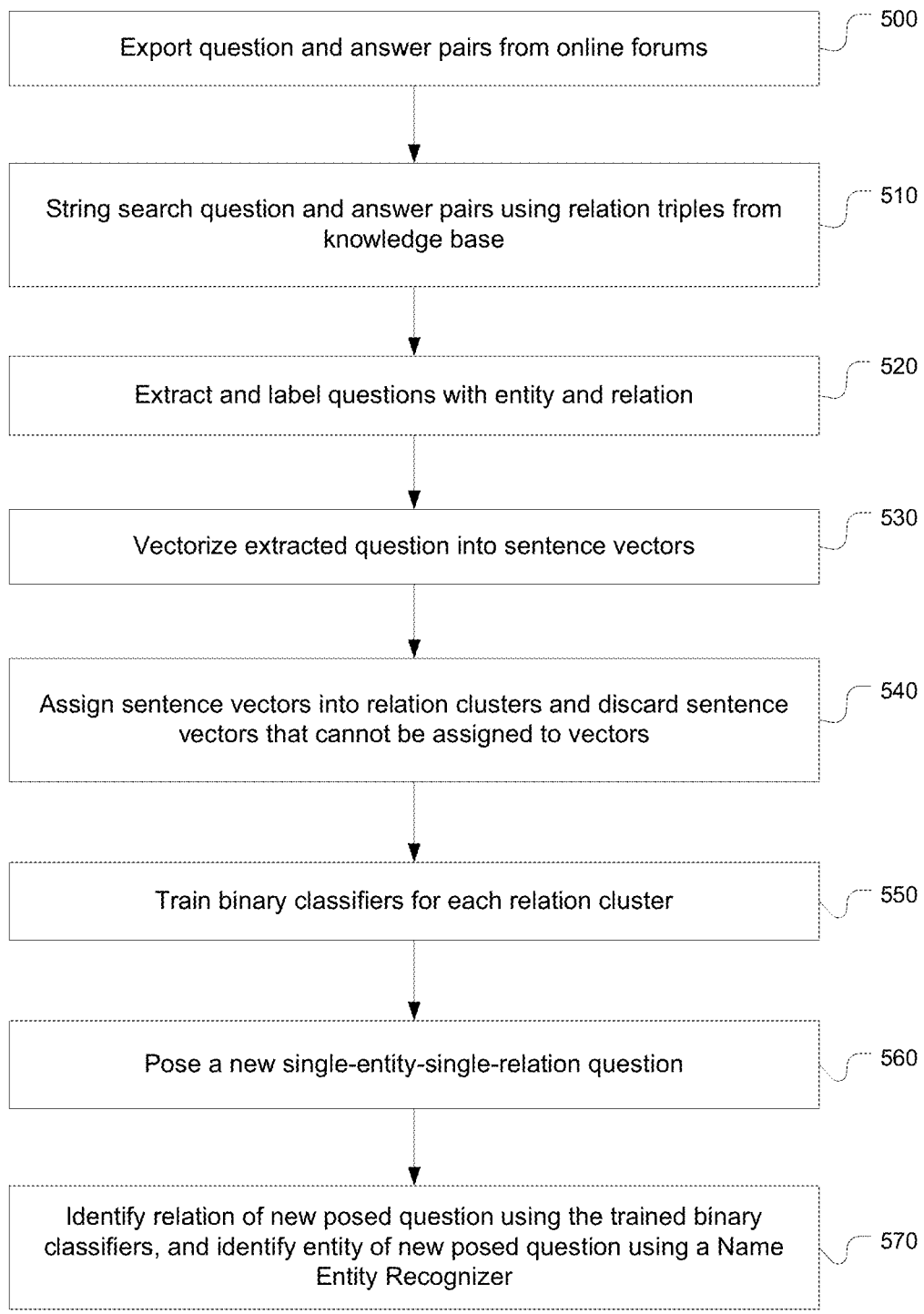
FIG. 1B is a flow chart showing the steps of an embodiment of a method of answering single-entity-single-relation questions.

Turning to the embodiment illustrated in FIG. 1B, question and answer pairs are exported from online question and answer forums 500 and stored in system memory 110 in arrays of pairs, or arrays having multiple lines of pairs. Each line in the array comprises two strings of characters in two fields: a question string of characters in a question field and an answer string of characters in an answer field. Where a question on an online forum only has one posted answer, this question and answer pair is directly exported, for example, into a line in the array of pairs by storing the question as a string of characters in the question field and the answer as another string of characters in the answer field. Where a question has multiple answer postings for that question, each possible combination or pair of question and answer are iteratively exported into a line in the array of pairs. For example, where a question has three answer postings, this is exported into three lines in the array of pairs: 1) question and answer no. 1; 2) question and answer no. 2; and 3) question and answer no. 3.

In some embodiments, each array pair or each line in the array of pairs is indexed as:

Array pair=("question", "answer")

or similar formats thereof.

Knowledge base 300 contains self-defined arrays of triples or arrays having multiple lines of triples. Each triple comprise three fields: a first string of characters in the entity field, a second string of characters in the relation field, and a third string of characters in the value field. In some embodiments, each line in the array of triples is indexed as:

Array triple=("entity", "relation", "value")

or similar formats thereof. In some embodiments, arrays of triples are further organized in classes, for example, where each class contain arrays of triples having similar or same second string of characters in the relation field.

In some embodiments, the stings of characters are tokenized into a string of words and one or more words occupy each field in the array of pairs stored in system memory, and/or in the array of triples from the knowledge base.

As used herein, all references to a string of characters also refers to a string of words or a strings of words tokenized from the string of characters.

Extraction and Labeling

Once sources of community QA pairs are identified, the system is configured to collect and apply relation extraction criteria to the corpus of QA pairs stored as arrays of pairs in the system memory 110, in order to generate labeled data for machine learning. The system is configured to extract and identify patterns in QA pairs, and is supervised by the relation triples stored in knowledge bases as arrays of triples. For example, the system uses an entity-relation-value triple from a knowledge base as reference, and finds an associated QA pair by identifying pairs based on a first extraction rule: 1) the "entity" component of the relation triple is found in the question and 2) the "value" component of the relation triple is found only in the answer. Question and answer pairs meeting the criteria are selected for extraction. The questions are then labeled with the "entity" and "relation" components and become part of a library of labeled questions for use as training data for machine learning.

In some embodiments, extracting can include selecting, flagging, copying, moving, separating and/or otherwise identifying QA pairs or other data as suitable candidates for use in subsequent stages of the methods and processes described herein. In some embodiments, extracted question arrays can be stored in separate data structures from their source. In some embodiments, extracted question arrays can be flagged, linked or otherwise identified while remaining stored at their source locations.

As used herein, "supervise", "supervision" or "supervised learning" refers to the machine learning task of inferring a function from labeled training data or labeled structured data. The structured data consist of a set of training examples. In supervised learning, each example is a pair consisting of an input object (typically a vector) and a desired output value (also called the supervisory signal). Supervised learning takes the structured data and produces an inferred function, which can be used for mapping new examples. Optimally, the system is able to correctly determine the class labels for unseen or new instances and produce an answer, based on supervised learning using the provided examples.

Turning to FIG. 1A, text processor 120 selects a line of triples from knowledge base 300 one at a time. Turning to FIG. 1B, the text processor string searches 510 for the first string of characters in the entity field, in each of the question string of characters in the array of pairs stored in the system memory. Each question identified by the text processor by string searching then proceeds to a second round of string searching using the third string of characters in the value field of the respective line of triples. In this second round of string searching, the text processor 120 string searches for the third string of characters in each of the corresponding answer string of characters. Each question and answer array pair having question string of characters containing a first string of characters from the entity field of an array triple from the knowledge base, and having answer string of characters containing a third string of character from the value field of the same array triple are extracted and stored in system memory 110 as extracted a question array.

In preferred embodiments, the text processor further string searches for the third string of characters of the value field, in the question string of characters to ensure that there is no match. In this embodiment, the system is constrained to ensure that the third string of characters in the value field only appears in the answer string of characters.

In some embodiments, the stings of characters are tokenized into a string of words and string searching involves word searching.

For example, consider an entity-relation-value triple obtained from a knowledge base and indexed as:
  Knowledge base triple=("New York City", "population", "8336697")
and a QA pair obtained and exported from a QA source and indexed as:
Question answer pair=("How many people live in New York City?", "According to estimate, in 2012 New York City has a population of 8336697.")
Since the entity ("New York City") appears in the question while the value ("8336697") only appears in the answer, the question meets the first extraction criteria. The question is extracted and labeled with "New York City" as the entity and "population" as the relation, and stored as an extracted question array 520.

The extracted question array comprises an array with three fields: entity field, relation field, and labeled question field. The labeled question field contains the question string of characters, which may also be tokenized into a string of words. The entity and relation field contain the first and second string of characters from the array triple, which was used in extracting the question by string searching as explained above. In some embodiments, the extracted question array is indexed as:
  Extracted Question Array=("entity", "population", "labeled question")
Alternatively, the extracted question may be tagged with an array with two fields, entity field and relation field. For example, in some embodiments the extracted question array is indexed as:
  Extracted Question Array ("labeled question")=("entity", "population")
Other example formats in which the extracted question are indexed are also available. In this manner, the extracted question is labelled with entity and relation. Using the above New York City example, the extracted question array for this question is indexed, for example, as:
  Extracted Question Array=("New York City", "population", "How many people live in New York City?"); or
  Extracted Question Array ("How many people live in New York City?")=("New York City", "population")
In preferred embodiments, the question string of characters in the labeled question field of the extracted question array is stripped of the characters corresponding to the first string of characters in the entity field. The stripped characters may be replaced with a variable character. Again using the above example, the extracted question array for this question is indexed, for example, as:
  Extracted Question Array=("New York City", "population", "How many people live in e?")
  Extracted Question Array ("How many people live in e?")=("New York City", "population")
However, not all questions from the collected corpus of QA pairs are single-entity-single-relation questions. The more complex the question and answer, the more likely that multiple entity-relation-value triple can be associated with the question and answer pair. In some embodiments, the system is configured to extract a complex question multiple times by repeatedly string search different lines of array triples from the knowledge base against one question and answer array pair.

In one embodiment, the system 100 extracts a question multiple times using multiple array triples from knowledge bases. This results in multiple extracted question arrays from a single complex question and answer pair. For example, an array pair contains a question string of characters representing a complex question in the question field and an answer question string of characters representing a complex answer in the answer field. An example of a complex question is: "Tell me about New York City?"
The answer to this question on an online QA form can be extensive, covering various aspects of New York City from population to historical information or location. Given "Tell me about New York City" as the question string of characters, the corresponding answer string of characters likely contains various different third string of characters from the value field of multiple array triples from the knowledge base. For example, the answer string of characters may contain the third string of characters from the value field of the following array triples from the knowledge base:
  Knowledge base triple(1)=("New York City", "population", "8336697")
  Knowledge base triple(2)=("New York City", "location", "New York State")
  Knowledge base triple(3)=("New York City", "area", "305 square miles")

Accordingly, when multiple extractions are performed, multiples lines of extracted question arrays are created and indexed, for example, as follows:

Extracted Question Array (1)=("New York City", "population", "Tell me about e")

Extracted Question Array (2)=("New York City", "location", "Tell me about e")

Extracted Question Array (3)=("New York City", "area", "Tell me about e")

In some embodiments, the system 100 comprises a relation constrainer 130 to identify questions where multiple extraction of a question using array triples resulted in multiple extracted question arrays. The relation constrainer removes such questions from the system training data, such that question and answer array pairs that are string searched to contain data from only one array triple are retained. In this manner, the extracted questions used as system training data are limited to "single-entity-single-relation" questions.

The criteria or constraint applied by the relation constrainer 130 can also be expressed as follows. Given a list of triples from the array of triples in the knowledge base represented by: $K=\{(e, r, v)\}$ where $(e, r, v)$ represents an entity-relation-value triple index of the array of triples; a community question and answer data is represented by: $C=\{(q, a)\}$ where $(q, a)$ represents a question-answer pair index of the array of pairs; the extraction criteria further comprises a condition that for any entity-relation-value triple $(e, r, v) \in K$ and an associated QA pair $(q, a) \in C$, extract question q and label it with entity e and relation r if and only if $\forall(e, r', v') \in K$, then $(e, r', v')$ is associated with $(q, a) \Longleftrightarrow r'=r$ and $v'=v$. As used above, $\epsilon$ means "in". For example, "$x \epsilon A$" means an element x in an array set A.

In some embodiments, an extracted question labeled with the entity and relation from the array triples, if and only if all the above the conditions are met. In summary, relation constrainer 130 is used to ensure that as many possible questions are labeled correctly, and minimizes missing questions or wrong labels.

By performing relation extraction to QA pairs with supervision from relation triples stored in knowledge bases, the present system greatly reduces or removes the need for manual labeling or annotation. Accordingly, the present system provides the added benefit of end to end learning, where the middle manual labeling step is removed from the overall process and introducing automation of labeling of a larger source of varied data for machine learning. Furthermore, the present system differs from a system that simply searches for an answer, in that the present system generates a QA system that is designed to learn by converting natural language into parameters and numbers. In addition, the present system allows for labeling of data in various different languages using the same system and system process, and are not simply limited to English or Chinese. The above question extraction and the generation of extracted question arrays can be used for other languages by using community question answer sources and knowledge bases of corresponding languages.

In some embodiments, the system queries for question and answer pairs first using candidate entities before exporting questions and answers and applying relation extraction. Particularly where community QA data is large, it may be prohibitive to simply export all the data on a community question and answer forum and apply relation extraction to all the data. In such cases, the system is configured to query a search engine, such as Solr, using the first string of characters in the entity field from array triples in the knowledge base to first gather candidate question and answer pairs.

If a question contains or string matches with the first string of characters, the question and its answer are identified as a candidate question and answer pair. These candidate question and answer pairs are then exported into arrays pairs having a question field and an answer field, to which relation extraction is applied as described above. In this manner, relation extraction is applied to a smaller and more manageable number of array pairs.

To account for variation in entity names, the entities' aliases are identified using a redirect list (for example Wikipedia redirect list). As used herein "aliases" refer to variants of an entity or a value. For example, "Big Apple" is an alias of "New York City". Since variations and alternative for names exist in natural language, for example a city name may have variations and nicknames, identifying aliases during question extraction enlarges all possibilities in the dataset thereby allowing for more complete labeling and identification of triples.

One example alias discovery rule is: a) for each redirect target and redirect source on the list, add redirect source as an alias for redirect target, and b) for western names in the format of "First•Last", add "First Last" as an alias for "First•Last".

In some embodiments the system is configured to query for candidate question and answer pairs using entity names including entity names identified using aliases.

As used herein, "regular expressions" refer to specific, standard textual syntax for describing a search pattern. Each character in a regular expression (that is, each character in the string describing its pattern) is understood to be a metacharacter (with its special meaning), or a regular character (with its literal meaning). In some embodiments, the system uses regular expressions to describe or represent entity, and identifies and queries for candidate question and answer pairs using the regular expressions. In these embodiments, candidate question and answer pairs are searched using the regular expression as opposed to one-by-one comparison with the entity.

Although the experimental data and examples presented herein are in the Chinese language, the approach is language independent and applicable to English and other non-English languages. For example, a French QA system can be generated by resorting to French QA sources.

Clustering

In preferred embodiments, the data is filtered following extraction to remove mislabeled questions, for example by performing clustering, classification, or combinations thereof. In some embodiments, performing clustering, classification, or combinations thereof comprises reducing noise in the training data.

In some embodiments, the system 100 is further configured to filter out QA pairs that meet the extraction criteria but nonetheless are associated with incorrect relation triples from the knowledge bases. Since the extraction criteria looks to QA pairs to identify "entity" and "value", the system needs to further filter the labeled questions to ensure that the correct "relation" is identified for each pair. To do so, for each relation in the extracted question array, the system is configured to cluster extracted questions together based on questions having the same relation and also based on a measure of similarity between the question sentences. Questions that do not belong to any clusters are removed.

Turning to FIGS. 1A and 1B, the system comprises a vectorizer 140 that vectorizes extracted questions into multidimensional vectors 530. One example of a vectorizer is Word2vec™, which produces word embeddings from labeled question. As used herein, references to "Word2vec"

refers to a type of model used to produce word embeddings, examples of which are available at https://code.google.com/archive/p/word2vec/, the entire content of which is hereby incorporated by reference. These models are shallow, two-layer neural networks that are trained to reconstruct linguistic contexts of words. Word2vec takes a text corpus as input and produces the word vectors as output. It first constructs a vocabulary from the training text data and then learns vector representation of words. The resulting word vector file can be used as features in various natural language processing and machine learning applications. Word2vec takes as its input a large corpus of text and produces a vector space, typically of several hundred dimensions, with each unique word in the corpus being assigned a corresponding vector in the space. Word vectors are positioned in the vector space such that words that share common contexts in the corpus are located in close proximity to one another in the space.

As used herein, "vector space models" or "word embedding" refers to representing or embedding words or phrases in a continuous multidimensional vector space using real number vectors, where semantically similar words or phrases are mapped to nearby points. This model is based at least in part on the concept that words that appear in the same contexts share semantic meaning. For example, in a continuous vector space the words "king" and "queen" share one dimension. If the words "man" and "woman" are then mapped to the same vector space, "king" and "man" share another second dimension, while the words "queen" and "woman" share also this second dimension.

Examples of word embedding and vector space models are available at https://www.tensorflow.org/tutorials/word2vec, the entire content of which is hereby incorporated by reference. Using word embedding is advantageous since it allows for the context of the words to be constructed in a vectors space, which in turn allows for the meaning of the words to be more accurately identified. For example, Word2vec is a particularly computationally-efficient predictive model for learning word embeddings from raw text.

The vectorizer 140 comprises a neural network configured to represent or embed words and/or phrases in a continuous vector space using real number vectors. In some embodiments, the neural network is a recurrent neural network (RNN). For example, the neural network is a long short-term memory (LSTM) cell configured to allow data to flow both forwards and backwards within the network. The LSTM cell is configured to take one word at a time and computes probabilities of the possible values for the next word in a sentence. One example of such neural network is Word2vec. In some embodiments, the vectorizer is trained on the labeled and extracted questions in order to represent or convert words and/or sentences into vector representations.

In some embodiments, the question string of characters are converted into an array of words, having as many fields as there are words in the labeled question, indexed for example as:

Labeled question=(word$_1$, word$_2$, word$_3$, . . . word$_n$)

The array of words is then converted into an array of word vectors, where each word is converted by the vectorizer 140 into multidimensional vectors and assigned real number vector coordinate values. In some embodiments, the words are vectorized into more than 100-dimensional vectors. In preferred embodiments, the words are vectorized into 200-dimensional vectors, 300-dimensional vectors, or 400-dimensional vectors. The array of word vectors is indexed, for example, as:

Labeled question=(word$_1$(x$_1$,y$_1$,z$_1$ . . . ), word$_2$(x$_2$,y$_2$,z$_2$ . . . ), word$_3$(x$_3$,y$_3$,z$_3$ . . . ) . . . word$_n$(x$_n$,y$_n$,z$_n$ . . . ))

The vectorizer 140 then converts the array of word vectors into a final sentence vector with real number vector coordinate values. In some embodiments, the sentence vector is an average of all the word vectors in a sentence. In other embodiments, a sentence vector is generated by the vectorizer by recursively combining word embeddings using, for example a recursive or recurrent neural network and Word2Vec. Other conversions from word vector to sentence vectors are also possible. The final sentence vector is indexed for example as:

Labeled question sentence vector=(u, v, w, . . . )

As used herein, RNNs are called "recurrent" neural networks because they repeat the same computations on every element of a sequence and the next iteration depends on the networks' "memory" of previous steps. For example, one could predict the next word in a sentence given the previous words.

In some embodiments, vectorizing words and sentences are also expressed as follows. On a vocabulary V, a word embedding δ projects a word w ∈ V into an n-dimension vector v. With word embedding, a |V|-dimension straightforward vector representation is projected to a n-dimension vector:

Given indexed vocabulary V={w$_1$, w$_2$, . . . , w$_{|V|}$}, word embedding δ where ∀i, 1≤i≤|V|, δ(w$_i$)=vi=(v$_{i1}$, v$_{i2}$, . . . , v$_{in}$)=v$_{i1}$·e$_1$+v$_{i2}$·e$_2$+ . . . +v$_{in}$·e$_n$, and a sentence s with straightforward vector representation (c$_1$, c$_2$, . . . , c$_{|V|}$):

$$s = (c_1, c_2, \ldots, c_{|V|}) \quad \text{(Equation I)}$$

$$= c_1 \cdot w_1 + c_2 \cdot w_2 + \ldots + c_{|V|} \cdot w_{|V|}$$

$$\xrightarrow{\delta} c_1 \cdot v_1 + c_2 \cdot v_2 + \ldots + c_{|V|} \cdot v_{|V|}$$

$$= c_1(v_{1_1} \cdot e_1 + v_{1_2} \cdot e_2 + \ldots + v_{1_n} \cdot e_n) +$$

$$c_2(v_{2_1} \cdot e_1 + v_{2_2} \cdot e_2 + \ldots + v_{2_n} \cdot e_n) + \ldots +$$

$$c_{|V|}(v_{|V|_1} \cdot e_1 + v_{|V|_2} \cdot e_2 + \ldots + v_{|V|_n} \cdot e_n)$$

$$= (c_1 v_{1_1} + c_2 v_{2_1} + \ldots + c_{|V|} v_{|V|_1}) e_1 +$$

$$(c_1 v_{1_2} + c_2 v_{2_2} + \ldots + c_{|V|} v_{|V|_2}) e_2 + \ldots +$$

$$(c_1 v_{1_n} + c_2 v_{2_n} + \ldots + c_{|V|} v_{|V|_n}) e_n$$

$$= (c_1 v_{1_1} + c_2 v_{2_1} + \ldots + c_{|V|} v_{|V|_1},$$

$$c_1 v_{1_2} + c_2 v_{2_2} + \ldots + c_{|V|} v_{|V|_2}, \ldots ,$$

$$c_1 v_{1_n} + c_2 v_{2_n} + \ldots + c_{|V|} v_{|V|_n})$$

Once all the question strings of characters from the labelled question field of all the extracted question arrays are vectorized into a sentence vector for each question sentence, the system 100 clusters the sentence vectors into clusters based on the common or equivalent second string of characters from the relation field of the extracted question arrays. Turning to FIGS. 1A and 1B, clusterer 150 assigns the sentence vectors into clusters based on their relative spatial distances from each other in a multidimensional vector space. Sentence vectors that cannot be assigned to a cluster is discarded and the extracted question array corresponding to that sentence vector is discarded from the training data 540.

The distance between two sentence vectors are quantified using cosine similarity. As used herein, "cosine similarity" refers to a real-value function that quantifies the similarity between two objects, such as vectors by measuring the cosine of the angle between two vectors. For example the cosine similarity function determined by Equation II below.

$$\text{similarity} = \cos(\theta) = \frac{A \cdot B}{\|A\|_2 \|B\|_2} = \frac{\sum_{i=1}^{n} A_i B_i}{\sqrt{\sum_{i=1}^{n} A_i^2} \sqrt{\sum_{i=1}^{n} B_i^2}}$$ (Equation II)

If the distance between two sentence vectors are within a threshold value ("$\epsilon$"), then the two sentence vectors belong to the same cluster. To identify an appropriate threshold value, a random sample of questions is selected from the question field of the array pairs exported from the online question and answer forum. In other words, these sample questions have not yet been string searched for array of triples from the knowledge base. In some embodiments a random sample question set is generated using a randomizer. Given a random sample question set, all similar questions to the sample question set is identified from the online question and answer forum or from the exported array of pairs by keyword searching using a search engine, for example, Solr. The search engine indexes the data for information retrieval, and all similar questions to the sample question set are identified by full-text indexing and search of keywords or metadata searching of keywords. Once all similar questions to the random sample question set are identified by keyword search, these keyword-searched similar questions are manually categorized as either actually similar or different in meaning to a corresponding question from the random sample question set, from which the keyword searching is based. In this manner the keyword-searched similar questions is manually divided into a first group of similar in meaning questions and a second group of different in meaning questions. This is the only manual step in the process. The question sentences of the first and second group of similar and different questions and the random sample question set are vectorized by the vectorizer 140 into sentence vectors in the same manner as described above. Distances between sentence vectors from the first group of similar questions and the corresponding random sample questions are quantified using cosine similarity in the same manner as described above. The same is done for quantifying distances between sentence vectors form the second group of different questions and the corresponding random sample questions.

The resulting data is a first list of cosine similarity values for each sentence vector from the first group of similar questions, relative to sentence vectors of corresponding questions from the random sample question set. A first average value is determined using the cosine similarity values from this first list. A second list of cosine similarity values is also generated for each sentence vector from the second group of different questions, relative to sentence vectors of corresponding questions from the random sample question set. A second average value is determined using the cosine similarity values from this second list. Finally, a third average or a median value is taken using the first and second averages, and this third average or median value is assigned as threshold value $\epsilon$.

Returning to the sentence vectors of the labelled question sentences, these sentence vectors are assigned into clusters by the clusterer 150 in the multidimensional vector space if each and every sentence vector in a cluster are separated by each and every other sentence vector by a distance or cosine similarity value less than the threshold value $\epsilon$ calculated above using the random sample question set. To do so, the clusterer 150 starts with a starting sentence vector and identifies all sentence vectors with relative distance or cosine similarity value less than the threshold value $\epsilon$. The starting sentence vector and all sentence vectors identified as having a distance from the starting sentence below the threshold value $\epsilon$ are assigned as a cluster. In some embodiments, this cluster is then extended by further identifying sentence vectors having distance or cosine similarity value less than the threshold value $\epsilon$, relative to the sentence vectors already assigned to the cluster. This extension process is repeated until no further sentence vectors are found having distance or cosine similarity value less than the threshold value $\epsilon$. Outlier sentence vectors that do not fit into any clusters are discarded, and corresponding extracted question arrays from which the outlier sentence vectors are created are also discarded from the training data.

In some embodiments, the clusterer 150 is further configured to identify core sentence vectors and assign core sentence vectors to clusters. A sentence vector is identified as a core vector if within the threshold distance $\epsilon$ determined above there is a minimum number of sentence vectors. In preferred embodiments, this minimum number set as 1% of the number of extracted questions for a given relation, with an absolute minimum of 4.

In preferred embodiments where the question string of characters in the labeled question field of the extracted question array is stripped of the characters corresponding to the first string of characters in the entity field, the sentence vectors of question strings with similar sentence styles are also very similar or close together. Hence such sentence vectors are highly likely to be assigned into the same cluster. For example, for the below three extracted question arrays, the three question strings of characters in the labeled question field is very similar. The resulting three sentence vectors corresponding to the three example question strings below are likely assigned to the same cluster.

Extracted Question Array (1)=("New York City", "population", "How many people live in e?")
Extracted Question Array (2)=("Los Angeles", "population", "How many people live in e?")
Extracted Question Array (3)=("Toronto", "population", "How many inhabitants live in e?")

Preferably, the result of clustering the sentence vectors is that each cluster should contain sentence vectors of labeled questions all having the same relation in the corresponding extracted question arrays. In other words each cluster is a cluster of questions on a given relation. A particular relation's cluster contains sentence vectors that are derived from question string of characters or words of extracted question arrays all having the same or equivalent second string of characters in the relation field.

Classification

In order to answer a new posed question, the system 100 trains a set of binary classifiers—one binary classifier for each relation cluster—to determine whether the new posed question is similar to the questions (mapped as sentence vectors) of a particular cluster. If one of the trained binary classifiers identifies the new posed question as being similar to the questions of its corresponding cluster, the system 100 identifies that the new posed question is asking about the relation of this cluster. As used herein, "binary classification" is the task of classifying the elements of a given set into two groups, by training a binary classifier using a training set of data whose group membership is known 550.

The system 100 iteratively goes through each relation, and trains a binary classifier using the questions or the sentence vectors of the corresponding cluster of the relation. Binary classification trainer 160 trains binary classifier for each cluster's relation using, for example, random forest, support vector machines (SVM), naive Bayes classifiers, logistic regression, or neural networks. Binary classifiers may also be trained using other models. In some embodiments, random forests are used to train binary classifiers by constructing a multitude of decision trees at training time and outputting the class that is the mode of the classes (classification) or mean prediction (regression) of the individual trees. In other embodiments, the system uses SVM to train binary classifers by representing the examples as points in space, mapped so that the examples of the separate categories are divided by a clear gap that is as wide as possible. New examples are then mapped into that same space and predicted to belong to a category based on which side of the gap they fall.

Once the binary classifiers a trained, a vector such as a sentence vector is entered as input, and the binary classifier yields a class (for example, A or B) as output.

Although clusterer 150 groups together similar question; this does not necessarily remove noise. For example, the similar but irrelevant questions may be assigned into irrelevant clusters. Furthermore there may be overlaps between two or more clusters. If two clusters have too much overlap, they are not easily distinguishable from each other. In turn, the resulting trained binary classifiers would not be able to distinguish whether a new posed question belongs to, for example, the questions of the "population" cluster or the questions of the "location" cluster.

To remove irrelevant clusters and to remove clusters that are not sufficiently distinguishable from each other, some embodiments of the system 100 are further configured to measure the relevancy score of each relation and discard relations (and the binary classifier trained on this relation) if the relevancy score is below a threshold value θ.

First, the system 100 identifies potential overlapping cluster by identifying "related" relations. The system 100 iteratively goes through each relation from the extracted question arrays, and for each candidate relation ("$r_1$"), the system iteratively goes through the each relation again to identify a "related" relation ("$r_2$"). A "related" relation is identified if $r_1$ and $r_2$ satisfy the following cardinal condition:

$$\frac{card(E(r_1) \cap E(r_2))}{card(E(r_2))} \geq 0.1 \quad \text{(Equation III)}$$

where E(r) is, for example, a number, list, array, or links identifying different entities (first string of characters from the entity field) from the extracted question array for a given relation, and where "card" refers to cardinality or a measure of the number of elements of a set. System 100, iteratively scans through each extracted question array having $r_1$ in the relation field, and generates a set of elements where each element is a different entity from the extracted question arrays having $r_1$ in the relation field. For example:

Extracted Question Array (1)=("New York City", "population", "How many people live in e?")
Extracted Question Array (2)=("Los Angeles", "population", "How many people live in e?")
Extracted Question Array (3)=("Toronto", "population", "How many inhabitants are in e?")

For "population" as $r_1$, the set of elements for $r_1$ and the corresponding $E(r_1)$ are:
set of elements for $r_1$=("New York City", "Los Angeles", "Toronto") card $E(r_1)$=3

The expression card($E(r_1) \cap E(r_2)$) refers to the number of common elements between set $r_1$ and set $r_2$. For example, for the following set of elements for $r_2$:

Extracted Question Array (a)=("New York City", "location", "Where is e?")
Extracted Question Array (b)=("Los Angeles", "location", "In which state is e?")
Extracted Question Array (c)=("Ottawa", "location", "In which country is e?")
set of elements for $r_2$=("New York City", "Los Angeles", "Ottawa") card($E(r_1) \cap E(r_2)$)=2

If the cardinal condition according to Equation III above is greater than or equal to 0.1, $r_2$ is identified as a "related" relation. In preferred embodiments, $r_2$ is identified as a "related" relation if the cardinal condition according to Equation III above is between 0.1 and 0.2.

A first binary classifier is trained using the corresponding cluster of candidate relation $r_1$, and a first f1-measure is obtained for this binary classifier of the candidate relation $r_1$. A second binary classifier is trained using the corresponding cluster of the "related" relation $r_2$, and a second f1-measure is obtained for this second binary classifier of the candidate relation $r_2$.

In some embodiments, whichever first or second f1-measure that has the lower value is selected as the relevancy score of the binary classifier of the candidate relation $r_1$. If that relevancy score is below the threshold value θ, that relation's classification model is discarded. In other embodiments, the f1-measure is the relevancy score, and whichever first or second f1-measure (or, first or second relevancy score) is below the threshold value θ, that relation's classification model is discarded. In some embodiments, the f1-measure is the relevancy score; and if the lower of the first or second f1-measure (or, first or second relevancy score) is below the threshold value θ, then the classification model of the relation having the lower f1-measure or relevancy score is discarded.

As used herein, "f1-measure" is a statistical measure of a test's accuracy, in this case the accuracy of the binary classifier. It considers both the precision p and the recall r of the test to compute the fi-measure. p is the number of correct positive results divided by the number of all positive results, and r is the number of correct positive results divided by the number of positive results that should have been returned. The f1-measure can be interpreted as a weighted average of the precision and recall, where an fi-score reaches its best value at 1 and worst at 0. F1-measure is the harmonic mean of precision p and recall r, expressed by the formula:

$$F_1 = 2 \cdot \frac{1}{\frac{1}{recall} + \frac{1}{precision}} = 2 \cdot \frac{precision \cdot recall}{precision + recall}$$

In some embodiments, the threshold value θ is between 0.5 and 0.9. In some embodiments, the threshold value θ is 0.6, 0.7, 0.8, or 0.9. In preferred embodiments, the threshold value θ is 0.7.

Question Parsing and Answering

The binary classification trainer 160 trains a binary classifier for each relation as explained above. These trained binary classifiers allows the system 100 to determine whether a new posed question is similar to the questions of a particular relation cluster. When a new question is posed 560 by user 400, binary classification trainer 160 iteratively applies the new question to each of the trained classifiers until a classifier yields an output that the new posed question belong to the class of questions of its cluster. Classifying the new posed question as belonging to the questions of a particular relation clusters allows the system 100 to identify that the new posed question is asking about the relation of this cluster. Accordingly, the relation of this new posed question is assigned as the relation of the cluster to which the corresponding binary classier has identified the new posed question to belong to.

In cases where more than one binary classifiers yield an output that the new posed question belong to the class of questions of its respective cluster, the system selects the binary classifier with the highest confidence score for the given output. The confidence score reflects the probability that the question is referring to certain a relation.

In order to find an answer to the new posed question, the system requires the entity of this new posed question. Turning to FIG. 1A, name entity recognizer (NER) 170 extracts all possible entities in the new posed question. As used herein, "name entity recognizer" labels sequences of words in a text which are the names of things, such as person and company names based on a pre-existing dictionary of names. Examples of NER include, but are not limited to: GATE™, OpenNLP™, Stanford Name Entity Recognizer™, Baleen™, or Cogcomp-NER™. The NER is in the same language as the community QA source and the knowledge base. For example, if a Chinese community QA source and knowledge base is used, a Chinese NER is also used.

Now that the entity and relation of the new posed question is identified 570, these two pieces of information are used to search through the array of triples in the knowledge base for an array that matches the identified entity and relation. The system 100 then returns the third string of characters in the value field of the matching array of triple as the answer to the posed question.

Since the training data is collected from QA sources or websites that are publically available, the collected QA data reflects the majority opinions of the users who generate the questions and answers. As well, the collected QA data follows and reflects the tends in majority opinion of the users.

The collection of extracted question array is continuously updated with community QA sources, as well as with each iteration of posing the system with a question and correctly answering the question. The results from posing the system with new questions are also added to the pool of training data, for example, by adding to question answer array or pairs, such that the system is dynamic and continuously learning.

Answer Triggering

In some embodiments, the question answer system is designed to identify and avoid answering non-single-entity-single-relation questions. In some of these embodiments, the system first uses the NER 170 to identify entities in a new posed question and the system answers "no answer" if no known entities are found in the new posed question.

Further Embodiments

For further implementations, the system is configured with automating the annotation of relation types in the knowledge database by utilizing the aggregation of all values belonging to the same relation. In some cases, automation of annotation can replace costly manual annotation.

Another embodiment for implementation includes configuring the system to identify and separate composite relations. Composite relations in knowledge bases, such as DBPedia, are a direct consequence of ambiguity of, for example, Wikipedia infobox tags and introduced by Wikipedia users incorrectly tagging infobox properties. For example, "capital" is a composite relation in Chinese DBPedia. It not only includes capital cities of regions and countries, but also includes financial assets of companies (the other meaning of capital). Every major component of the implementation, from extraction module to classification models, would benefit from splitting "capital" into two or more distinct relations.

Finally, syntactic information can be incorporated into the system. Using only bag-of-words models results in useful information such as word order and sentence structure being lost. Introducing syntactic features such as parse trees to the noise reduction procedure and classification models can be achieved by modifying the similarity measure described herein to include tree-kernel functions.

EXAMPLES

The following examples are illustrative of various aspects of the invention, and do not limit the broad aspects of the invention as disclosed herein.

The approach described herein was implemented on a large Chinese corpus with minimal annotation. Based on the data collected, the semantic parsing approach was taken to design a real-time QA system with the following goals in mind: 1) to answer as many single-entity-single-relation questions as possible with reasonable accuracy, and 2) to avoid answering non-single-entity-single-relation questions. Also, manual annotation is avoided as much as possible because manual labeling is costly and limits the scale of the system. The approach uses knowledge bases to supervise the extraction of questions by relation, sifts through the noisy extracted data, and learns each relation's question patterns. Through experiments, it was demonstrated that the system has learned to answer questions not present in its training data and even beyond the community QA data while maintaining a high accuracy on answered questions.

Figure 1C:
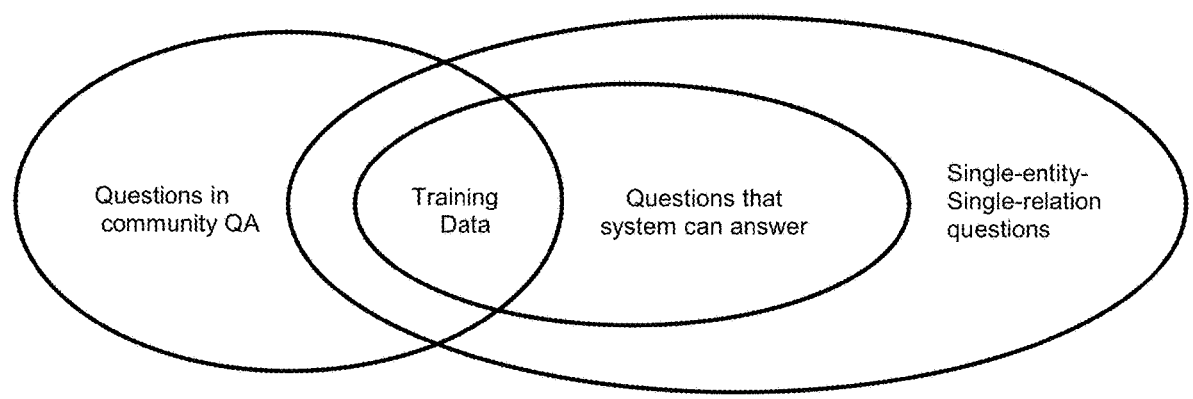
FIG. 1C shows a Venn diagram of the relationships between community QA questions, single-entity-single-relation questions, and questions that the system described herein has learned to answer.

Experiments show that the implementation manages to answer questions in test cases independent of the corpus with relatively high accuracy and to avoid answering questions beyond its scope, achieving a high accuracy on answered questions. FIG. 1C illustrates the relationships between community QA questions, single-entity-single-relation questions, and questions that the implementation has learned to answer. Last but not least, the implementation managed to answer a question within 20 milliseconds on a desktop environment.

Methodologies

A bag-of-words approach was chosen, having four major steps:

1. (Offline) Extract single-entity-single-relation questions from community QA data with the guidance of triples from knowledge base (see "Question Pattern Extraction" below).

2. (Offline) Reduce the noise present in the extracted question by clustering (see "Noise Reduction" below).

3. (Offline) Evaluate the filtered questions via classification and train models with selected data (see "Pattern Evaluation and Model Selection" below).

4. (Online) Parse question and rank potential answers.

Question Pattern Extraction

In the Chinese question-answering case, the system needs single-entity-single-relation questions, with the mentioned entities and implied relations labeled, in order to learn the varied question patterns for each relation. For example, for question "碟中谍是谁拍的？(Who directed Mission Impossible?)", the corresponding annotation is "碟中谍 (Mission Impossible)" as the entity and "导演 (director)" as the relation. With such labels, the system can deduce that "X 是谁拍的？(Who directed X?)" is likely to be asking about the "导演 (director)" of X.

Distant supervision is a technique used to generate large amounts of automatically labeled training data effectively. It assumes that if an entity-relation-entity triple exists in a knowledge base, then any sentence that contains the pair of entities is likely to express the relation in some way. It is a strong assumption but introduces wrong labels into the training data, hindering the performance of trained models. Also, it is limited to relations between entities in the sense that literals, such as dates, numbers, and strings, are not considered during the extraction process. As a result, data pertaining to relations that involve an entity and a literal, e.g. birthday, population, etc. cannot be generated when using distant supervision.

To overcome these challenges, the system is configured to apply distant supervision to extract QA pairs instead of sentences and to include entity-literal relations. To do so, the system is configured to extract and label questions obtained from a corpora of community QA pairs.

For an entity-relation-value (value can be an entity, or a literal) triple in a knowledge base, a QA pair is said to be associated with the triple if the two following conditions are met:
1. The question contains the entity but not the value,
2. The answer(s) contain the value.

For each entity-relation-value triple, all questions in associated QA pairs are extracted and labeled with terms identifying the "entity" and "relation" of the question.

Because answers on community QA sites vary from few words to several long paragraphs, they tend to carry more information compared to single sentences. As a result, QA pair extraction introduces more noise than sentence extraction. For example, consider the QA pair ("介绍一下纽约市(Tell me about New York City)", "纽约市位于纽约州南端， 是美 国人口最多的城市，常驻人口8336697人，土地面积305平方英里 . . . (New York City is located at the southern tip of the State of New York. With a population of 8,336,697, it is the most populous city in the United State. It has a land area of 305 square miles . . ."). The question does not fall into single-entity-single-relation category; however, simply applying the extraction rule stated above, the question would be extracted multiple times and labeled with relations such as population, location, area, etc.

Noise is mitigated by introducing additional constraint. Under the simple extraction rule, for each extraction, only one entity-relation-value triple is used to guide the process. Yet in knowledge bases, an entity has more than one entity-relation-value triples. Intuitively, if a QA pair can only be associated with one entity-relation-value triple, it is more likely to be about the "relation" in the triple. In the "介绍一下纽约市 (Tell me about New York City) example above, if the extraction was limited to questions where the QA pair can only be associated with one triple, this example question will not be selected for extraction.

The system uses the following rule to extract questions from community QA pairs:

Given knowledge base K={(e, r, v)} where (e, r, v) represents an entity-relation-value triple, and community QA data C={(q, a)} where (q, a) rep-resents a question-answer pair, for any entity-relation-value triple (e, r, v) ∈ K and an associated QA pair (q, a) ∈ C, extract question q and label it with entity e and relation r if and only if ∀(e, r', v') ∈ K, (e, r', v') is associated with (q, a)⇔r'=r and v'=v.

For further processing, extracted questions are stripped of the labeled entities and group them by the labeled relations. For example, "纽约市有多少人？(How many people live in New York City?)" is stored as "e有多少人？(How many people live in e?)" with other questions such as "e 的人口是多少？(What is the population of e?)" under relation "人口 (population)".

Noise Reduction

As the data is produced by automatic extraction instead of manual labeling, it is expected to contain more noise; therefore, noise reduction is a critical step. Consider the triple ("纽约市 (New York City)", "人口 (population)", "8 million") and the QA pair ("纽约市一套 房多少钱？(How much does a house in New York City cost?)", "8 million"). In this example, the question is not asking about the population of New York City, it would be labeled with "New York City" and "population" because the QA pair meets the extraction criteria (question contains "New York City" as entity and the answer contains " "). Mislabeled questions should be filtered out and retain as many different question patterns as possible.

Whether a question is making an inquiry about certain relation is closely related to whether there are many similar questions labeled with the same relation. If several questions with the same relation label have a similar pattern, it is likely that the shared pattern is an inquiry template about the relation. Meanwhile, if a question pattern is a popular inquiry about certain relation, many people would use it when they ask about the relation; as a result, the pattern is expected to match several questions in the collected data. Following this reasoning, clustering was used for noise reduction. For each relation, similar questions were clustered together and consider the questions without cluster assignments as noise.

Sentences were modeled as bags of their words and two sentences are considered to be similar if their vocabularies overlay: the more words the sentences share, the more similar they are considered to be. This can be measure by calculating the cosine similarity between two vector representations. Given an indexed vocabulary V, a straightforward bag-of-words vector representation of a sentence would be a |V|-entry vector, where i-th entry is the count of the i-th word of V in the sentence. But in the example case using the Chinese language, calculating similarity directly on bag-of-words representations is undesirable, mainly for two reasons:

the Chinese language has tens of thousands of unique characters and millions of common words. As a result, straightforward vector representations of bag-of-words models are sparse. Moreover, the system calculates similarity measures between short sentences instead of long passages, so it is less likely that two vectors have non-zero values on any given component. Due to these factors, coarse-grained similarity measures will be obtained: because the values on each dimensions are restricted to integer values, the cosine similarity between a m-word sentence and a n-word sentence can only be one of the m·n discreet values between 0 and 1, no matter how they vary in meaning. This makes differentiation difficult.

for cosine similarity to accurately reflect how similar two vector are, the basis vectors need to be independent of each other. However, individual words, the basis vectors in this case, clearly are not independent of each other. Therefore, cosine similarity over straightforward bag-of-words vector representations is not accurate. For example, consider phrase pair ("非常 (very) 好 (good)", "很 (very) 好 (good)") and phrase pair ("很 (very) 好 (good)", "不 (not) 好 (good)"): both would have a cosine similarity of 0.5, yet the first pair has similar meanings while the second pair has opposite meanings.

To refine the similarity measure, word embeddings are used. On a vocabulary V, a word embedding δ projects a word w ∈ V into an n-dimension vector v. With word embedding, a |V|-dimension straightforward vector representation is projected to a n-dimension vector:

Given indexed vocabulary $V=\{w_1, w_2, \ldots, w_{|V|}\}$, word embedding δ where ∀i, 1≤i≤|V|, $\delta(w_i)=vi=(v_{i1}, v_{i2}, \ldots, v_{in})=v_{i1}\cdot e_1+v_{i2}\cdot e_2+\ldots+v_{in}\cdot e_n$, and a sentence s with straightforward vector representation $(c_1, c_2, \ldots, c_{|V|})$:

$$s = (c_1, c_2, \ldots, c_{|V|})$$
$$= c_1 \cdot w_1 + c_2 \cdot w_2 + \ldots + c_{|V|} \cdot w_{|V|}$$
$$\xrightarrow{\delta} c_1 \cdot v_1 + c_2 \cdot v_2 + \ldots + c_{|V|} \cdot v_{|V|}$$
$$= c_1(v_{1_1} \cdot e_1 + v_{1_2} \cdot e_2 + \ldots + v_{1_n} \cdot e_n) +$$
$$c_2(v_{2_1} \cdot e_1 + v_{2_2} \cdot e_2 + \ldots + v_{2_n} \cdot e_n) + \ldots +$$
$$c_{|V|}(v_{|V|_1} \cdot e_1 + v_{|V|_2} \cdot e_2 + \ldots + v_{|V|_n} \cdot e_n)$$
$$= (c_1 v_{1_1} + c_2 v_{2_1} + \ldots + c_{|V|} v_{|V|_1}) e_1 +$$
$$(c_1 v_{1_2} + c_2 v_{2_2} + \ldots + c_{|V|} v_{|V|_2}) e_2 + \ldots +$$
$$(c_1 v_{1_n} + c_2 v_{2_n} + \ldots + c_{|V|} v_{|V|_n}) e_n$$
$$= (c_1 v_{1_1} + c_2 v_{2_1} + \ldots + c_{|V|} v_{|V|_1},$$
$$c_1 v_{1_2} + c_2 v_{2_2} + \ldots + c_{|V|} v_{|V|_2}, \ldots,$$
$$c_1 v_{1_n} + c_2 v_{2_n} + \ldots + c_{|V|} v_{|V|_n})$$

Compared to straightforward bag-of-words vector representation, the above vector representation has many benefits. First, the vector space has drastically fewer dimensions, and the vectors have real-number values instead of positive integer values on each dimension. Accordingly, cosine similarity would give more continuous numeric values and have better differentiation. Moreover, if the word vectors have the property that similar words have higher cosine similarities, cosine similarity based on this representation would be more accurate.

For clustering, unsupervised density-based clustering algorithms are used. Compared to other clustering algorithms, density-based algorithms have several advantages that suits the system. First, density-based clustering works on unlabeled data. Second, density-based clustering allows outliers with no cluster assignments. In the case, such observation points which are distant from other observations are noise. Finally, density-based clustering does not need information on number of clusters. The system cannot reasonably estimate number of clusters because it is impractical to estimate each relation's number of question patterns and one cluster may contain several question patterns if the patterns are similar enough.

As the system is looking for universal patterns for each relation, additional restraints are placed to restrict any single entity's influence, for example: if all the questions in a cluster are labeled with one single entity, all the question in the cluster are discarded as noise.

Pattern Evaluation and Model Selection

In the noise reduction step, questions are filtered out that do not have enough similar questions to form clusters. However, this does not eliminate all noise. When the system operates on huge amounts of data, there may be a sufficient number of similar irrelevant questions for irrelevant clusters to form and thereby pass the noise filtering. The processed data of each relation need to be evaluated.

The relevancy of each relation's data is measured by testing it against noise and other relations' data:

the system tests whether it is distinguishable from the noise of the noise reduction step. If it is difficult to tell it apart from noise, the data is likely to be noise. For example, the data may consist of aforementioned irrelevant clusters.

the system tests whether it is distinguishable from the data of the relation's related relations. Here, relation B is relation A's related relation if entities with entries on relation A in the knowledge base are likely to also have entries on relation B. If it is difficult to separate the data from related relations' data, the data is likely to be about multiple relations. For example, the data may consist of clusters similar to related relations' data. Testing is restricted to against related relations instead of all other relations because in the knowledge base many relations have the same meaning and their data would be indistinguishable from each other.

Testing distinguishability is approached as a classification task. Using bag-of-words model, if two collections of questions are distinguishable from each other, binary classifiers trained on the collections are expected to achieve high f1-measures. For each relation, cross-validation iterations of binary classifiers are conducted on its data against noise and on its data against its related relations' data, independently. The two average f1-measures are calculated, and use the lower one as the relation's relevancy score.

Relations whose relevancy scores are higher than certain threshold are retained, and train classifiers on the data without any holdout. For each relation, there is a classifier on its data against noise and a classifier on its data against its related relations' data. Combined, these classification models can tell whether a new question is similar to the data of retained relations. In other words, given a question, the system can identify which relation the question is referring to.

Question Parsing and Answering

Once the training data is filtered as described above, the system proceeds with identifying the "relation" component of a question. In order to search the knowledge base for the answers to the question, the system only needs to extract the entity in the question by using, for example, a named-entity recognizer (NER). For each entity candidate e that NER returns, the relation r in the question is identified with classifiers and search the knowledge base for triples that have e as entity and r as relation. The system ranks the results by the classifiers' output, i.e. probability that the question is referring to certain relation, and return the answer with the highest score.

Data and Implementation

Data

As data plays a critical role in the system, the implementation is closely coupled with the data used. The following Chinese resources were used for the implementation of the Chinese example case:

DBpedia Infobox Properties

For knowledge base, DBpedia is used (Auer et al., 2007), obtained from DBpedia 2014 data dump (oldwiki.dbpedia.org/Downloads2014). It consists of information extracted from Wikipedia infoboxes, stored as entity-relation value triples. DBpedia is used because it is the only publicly available knowledge base in Chinese.

The release has 7,285,034 entries on 422,728 entities and 23,219 relations. An entity is a link to a Wikipedia article. Since a Wikipedia article can be uniquely identified by its title, the title is used to denote the entity. A relation is a nominal tag, for example, a parameter name in the Wikipedia infobox. However, in this case, the tags often differ from the parameter names and are not accurate descriptors for the relations. For example, while the actual parameter names are all Chinese, only 6,523 out of 23,219 relation tags in the data are Chinese. A value is either an entity or a literal with type, e.g. number, text, date.

As the data is automatically extracted from Wikipedia, it has several issues aside from errors in values. First of all, the data unfortunately includes meta information in infoboxes such as "imagesize" as relation entries. Additionally, the literal types are inaccurate. For example, date values are often mislabeled as number values. Literal types are important to us because natural expression can vary a lot from DBpedia expression depending on the actual data types. For example, date is stored as "yyyy-mm-dd", a format that does not exist in conversation or community QA questions.

To mitigate the issues, the top 400 English relation tags and the top 404 Chinese relation tags were annotated with type "meta", "entity", "number", and "date". 29 relations are labeled "number", 55 relations are labeled "date", 389 relations are labeled "entity", and the rest 331 relations are labeled "meta". The 804 annotated relation tags cover 416,254 (98.5%) entities and 5,763,288 (79.1%) triples. Among them, 473 (58.8%) have non-meta types, covering 380,513 (90.0%) entities and 2,467,063 (33.9%) triples. 273 out of 473 tags are in Chinese. This is the only human annotation needed in the implementation.

Community QA Pairs

The system has a data set consisting of 366,381,454 QA pairs from community QA websites in China, including the two largest websites, Sougou Wenwen (formerly known as Tencent Wenwen Soso) and Baidu Zhidao. Each pair contains one question and at least one answers. The questions cover a wide range of topics from computer games to agriculture.

Around 100 million questions are dated before 2010 and were collected by others in 2010. The system contributed the rest of questions, dated between 2010 to 2014, by scraping the websites from 2013 to 2015. The data is indexed and stored using Apache Solr. In this setup, Solr works like a search engine, allowing keyword matching or searching against questions.

Wikipedia Redirect List

The Wikipedia redirect list is used to identify aliases in name entity recognition, obtained from Wikipedia data dump (dumps.wikimedia.org/zhwiki/). The list has 576,627 redirect entries.

Pre-Trained Word2vec Word Embedding

A word2vec (Mikolov et al., 2013) word embedding is trained from the community QA data set. There are 4,128,853 word vector representations and each vector has 200 dimensions.

Experiment Environment

The system is trained and implemented on a 4-core CPU 16 GB memory desktop in Java.

Question Pattern Extraction

Because the community QA data is huge, it is prohibitive to iterate through the data to fetch candidate questions for extraction. Instead, for each entity candidate question-answer pairs are gathered by querying Solr with its name. Finding entities' names is a challenge: in DBpedia, each entity only has one official name, which often is different from how the entity is mentioned in real life. For example, "上海市 (Shanghai City)" is the official name and is the one on DBpedia's record, but the shortened form "上海 (Shanghai)" is used most often in reality, and there are many other more often used nicknames such as "魔都 (Mordor)", "沪 (a river near Shanghai)", and "申 (name of a feudal fief lord that governed Shanghai)" The issue is complicated by formatting: western names in DBpedia use a space, or the "•" symbol to separate first name and last name, while online users in China often do not. Therefore, if Solr is queried with only the official name, it would significantly reduce the candidate pool for extraction.

The entities' aliases are identified with the help of Wikipedia redirect list and formatting rules. As Wikipedia is the source of DBpedia's information, the redirect target on the list uses the same official name as DBpedia, making the list the prime resource for alias discovery in this case. The two following two simple rules for alias discovery:

for each redirect target and redirect source on the list, add redirect source as an alias for redirect target.

for western names in the format of "First•Last", add "First Last" as an alias for "First•Last".

In total, 653,818 names were discovered for 380,513 entities. For each name, Solr was queried for questions that contain the name. 78,433 queries return 114,884,161 questions in total (one question may appear multiple times). The low coverage, 12.0%, of the names is expected and shows that community QA do not have information on many entities.

The next step is to determine whether a QA pair is associated with an entity-relation-value triple. To do so, a value's presence in a question or an answer needs to be detected. This is achieved by generating regular expressions automatically based on the value and the relation's type:

if the relation has "meta" type, the relation is discarded altogether because "meta" information such as "imageheight" is specific to the Wikipedia and irrelevant to the entities.

if the relation has "entity" type, regular expressions are generated that literally match one of the entity's discovered aliases. For example, for entity-typed value "上海市", regular expressions "上海市", "上海", "沪", and "申" are generated.

if the relation has "number" type, regular expressions are generated that match any number within a close range of the value. Approximation is crucial because in the DBpedia, number-typed values can be accurate to several digits after the decimal mark, while online users rarely match the exact same accuracy. For example, for number-typed value "1532.7" regular expression "153[0–9]([^0–9]|$)" is generated; if the value is followed by a unit such as "米(meter)", regular expression "153[0–9](\.[0–9]*)?米" is generated.

if the relation has "date" type, regular expressions are generated that match the date in the most commonly used format. For example, for date-typed value "2016-07-01" regular expression "2016年7月1日" is generated. If the month or day information is missing in the value, the regular expression is adjusted accordingly. The format change from DBpedia's "yyyy-mm-dd" is crucial for successfully detecting the values.

For each entity, all the regular expressions are generated for its relations and iterate through its candidate QA pairs. Given a QA pair, it is tested against every relation of the entity to see:

whether any regular expression matches the question. If there is a match, the question is not associated with the relation.

whether any regular expression matches one of the answers. If there are no matches, the question is not associated with the relation.

If a QA pair is associated with only one relation, the question is extracted, the appearance of the entity in the question is replaced with a marker, and grouped with other extracted questions under the relation.

Figure 2:
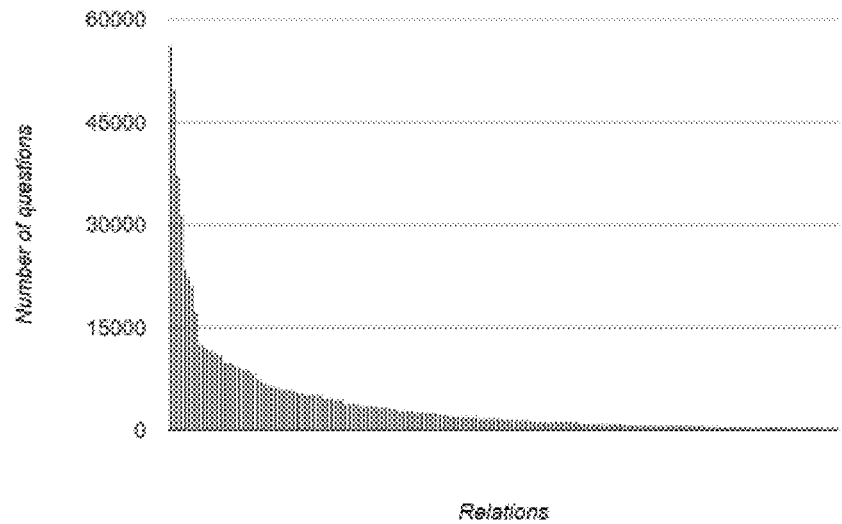
FIG. 2 shows the number of extracted questions that are associated with each relation triple obtained from an example knowledge base.

On average, a relation has 1,533,859 QA pairs tested against it. Among those, questions in 883,836 (57.6%) pairs do not contain the value, 2,257 (0.15%) pairs are associated with at least 1 triple, and only 1,668 (0.11%) questions are extracted. In general, the numbers of questions display a long-tail pattern (see FIG. 2), with the top 20% relations being associated with 88.0% percent of the total questions. Moreover, 75 relations do not have any questions extracted. The number of extracted questions has a Pearson product-moment correlation coefficient of 0.34 with the number of QA pairs tested and a Pearson product-moment correlation coefficient of 0.97 with the number of QA pairs which are associated with at least 1 triples.

Noise Reduction

The word embedding the system uses is trained with word2vec and covers 4,128,853 words. It has the property that similar words have higher cosine similarity. The extracted questions are made up of 97,910 different words, which are all contained in the word embedding. However, the word embedding does not contain English words. As a result, questions that have English words are discarded.

DBSCAN (Ester et al., 1996) is used to cluster the questions. DBSCAN is one of the density-based clustering algorithms, which assigns closely packed data points to clusters and mark remote points as outliers. Aside from not requiring information on the number of clusters, which cannot be determine beforehand, its advantages include having few parameters and being able to find arbitrarily-shaped clusters.

DBSCAN has two parameters: $\in$, a distance threshold, and minPoints, the minimum number of data points required to form a cluster. A data point is either assigned to a cluster or classified as noise. To be assigned to a cluster, a data point needs to meet one of the two conditions:

Core points: if in its $\in$-neighborhood there are at least minPoints data points (including itself), then the data point is a core point of a cluster.

Edge points: if the data point is not a core point and there exists a core point such that the distance between the core point and the data point is less than s, then the data point is an edge point of a cluster.

For the implementation, the system uses the Java API of WEKA (Hall et al., 2009). The system needs to define the distance between two questions and provide $\in$ and minPoints.

Building on the cosine similarity between bag-of-words modeling of the questions, distance is defined as 1–cosine similarity. It has a real value between 0 and 2. 1,000 questions are randomly sampled from the extracted data and calculate the distance between every two of them. The average distance of the 249,750 pairs is 0.70.

Ideally, $\in$ should be set to a value such that any two questions are similar in meaning if and only if the distance between the two is lower than $\in$. If $\in$ is set too large, every data point would be assigned to a single cluster and a lot of noise will result; if $\in$ is set too small, few data points will be assigned to clusters and the system will have few data to work with.

To determine the value empirically, 96 questions are randomly sampled from the community QA data directly and query the Solr system for questions that share keywords with them. In the 2,014 top results, 1,591 questions are found to be different in meaning and 423 to be asking about the same question. The average distance between the 1,591 pairs of different meanings is 0.32, which is significantly lower than the 0.70 average in the sample of extracted data. This is expected because 0.32 is the average between pairs that share words while 0.70 comes from pairs that may or may not share words. Meanwhile, the average distance between the 423 pairs of very similar meaning is 0.12. The $\in$ is chosen to be 0.2, which is approximately the average of 0.12 and 0.32.

Parameter minPoints also needs to be set properly. In an extreme case with minPoints=1, every data point would be a cluster itself. Additionally, minPoints should be different for each relation. It is unreasonable to use the same threshold for a relation with under 100 extracted questions as for a relation with over 10,000 extracted questions.

Setting minPoints puts an upper bound on the number of clusters DBSCAN produces and does not affect the lower bound. As each cluster incorporates at least one question pattern, the upper bound of number of clusters can be estimated by estimating the upper bound of number of question patterns a relation can have. The system sets minPoints to be 1% of the number of extracted questions of the relation with a minimum of 4. As long as there are fewer than 100 question patterns that differ a lot from each other, the system would be able to identify all the clusters. For patterns with fewer than 1% questions, if such patterns ever exist, they are regarded as too marginal for the system.

After clustering, our system examines every cluster and discards clusters where every question is labeled with the same entity.

Figure 3:
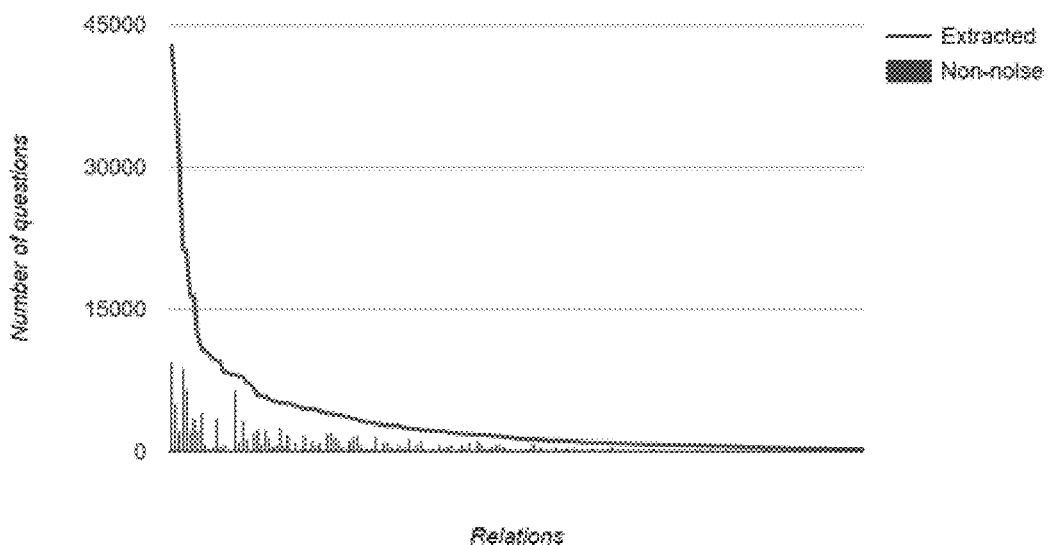
FIG. 3 shows a comparison between the number of extracted questions from FIG. 2 and the number of non-noise questions following filtering, for each particular relation triple.

After discarding questions with English words, there are 392 relations with more than 1 questions. On average, for each relation, the algorithm runs at minPoints=18, discovers 2 clusters, discard 1 cluster, and marks 1263 questions out of 1615 as noise. In total, 242 relations have at least 1 non-noise questions. As shown on FIG. 3, the noise ratios vary across relations. Number of extracted questions and number of non-noise questions have a Pearson product-moment correlation coefficient of 0.82.

Pattern Evaluation and Model Selection

In classification, weighting is used when there is an imbalance between number of positive instances and number of negative instances, which is the case in this data. Moreover, for f1-measure to be comparable across different relations, the ratio of positive to negative should remain constant. Weighting is used to achieve a 1:1 ratio of positive to negative.

Aside from having support for weighting, the classification model used should also be fast. For each parameter iteration, nearly a thousand models are trained. Since cross validation is also conducted, the running time is multiplied by the number of folds of cross validation times number of runs in cross validation. As a result, the system is looking at the running time of training hundreds of thousands of models.

Random forests (Breiman, 2001) are used as the classification method. Based on decision trees, random forests are simple, fast, and resistant to overfitting on training data. To overcome the overfitting tendency of decision trees, random forests apply two ensemble learning techniques:

Bootstrap aggregating (bagging): for each decision tree, instead of learning from the whole training data, it learns from a random sample with replacement of the data.

Random subspace method: for each decision tree, instead of learning from all the features, it learns from a random subset of the features.

JAVA API of WEKA is used for implementation. For parameter $n_{tree}$, number of decision trees in random forests, the performance was tested on $n_{tree}=25$ and $n_{tree}=50$. Performance of random forests goes up with this parameter with a diminishing return. A larger value such as 100 could not be tested due to limitations of physical memory in the experiment environment, while a typical configuration would be $n_{tree}=10$ or $n_{tree}=30$.

Before the system evaluates the questions via classification, each relation's related relations still needs to be identified. Given a knowledge base, let $E(r)$ be the set of entities with relation $r$. For relation $r_1$ and $r_2$, if $$\frac{\text{card}(E(r_1) \cap E(r_2))}{\text{card}(E(r_2))} \geq 0.1,$$

the system adds $r_2$ to $r_1$'s related relations. Among the remaining 242 relations, on average, a relation has 16 related relations. The ratio of a relation's questions to those of its related relations is 1:18.

Additionally, the models need to be trained on a subset of noise questions instead of all the noise. As there are 494,922 noise questions, it is not feasible to use all the data due to physical memory constraint and time constraint. Therefore, noise questions are sampled without replacement at different sampling rates $r_{noise}$ for noise samples to train the models. The performance is tested for $r_{noise}=10\%$ and $r_{noise}=20\%$.

For each relation, the system conducts three five-fold cross validation on its filtered questions against noise sample, and on its filtered questions against its related relations' questions, independently. If the relation has fewer than 20 questions, it is discarded due to inadequate instance number. Accordingly, the system evaluates 208 relations.

Figure 4:
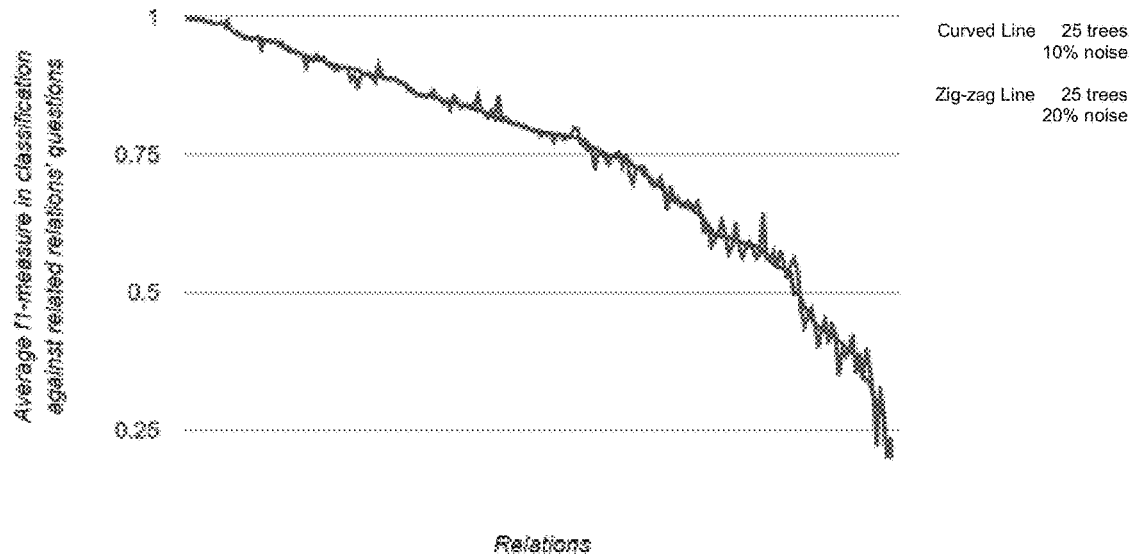
FIG. 4 shows an example plot of each triplet relation and its corresponding average f1-measures on questions against related relations' questions during two independent cross validation runs with the same parameters in an embodiment of a classification analysis according to the present system.

FIG. 4 plots each relation's average f1-measures on questions against related relations' questions during two independent cross validation experiments with the same parameters. Though the noise sampling rate is different, classification against related relations' questions does not involve noise samples. Therefore, the differences purely come from cross validation's random splitting of data. The differences have an average of 0.0001 and a standard deviation of 0.0169. This shows that the inherent randomness in the cross validation process is balanced out by averaging over three runs.

Figure 5:
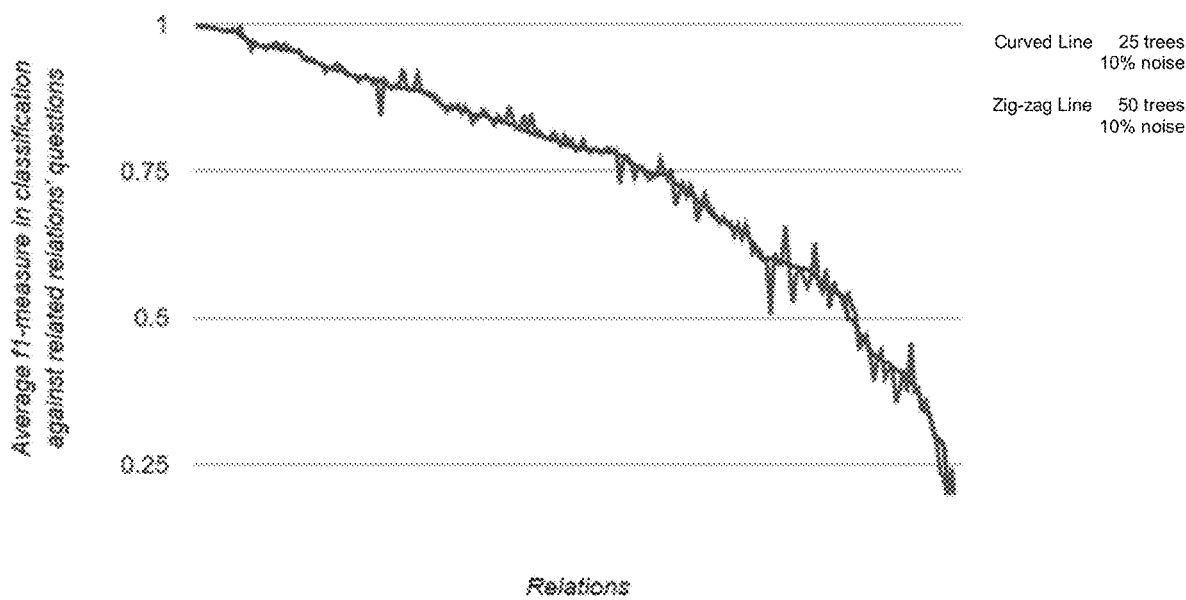
FIG. 5 shows an example plot of each triplet relation and its corresponding average f1-measures on questions against related relations' questions with $r_{noise}=10\%$ and different $n_{tree}$ values, in the embodiment of the classification analysis.

FIG. 5 plots each relations' average f1-measures on questions against related relations' questions with $r_{noise}=10\%$ and different $n_{tree}$ values. Overall the two series overlap and having more trees in the random forests does not provide a clear advantage in this case. The differences have an average of −0.0003 and a standard deviation of 0.0188.

Figure 6:
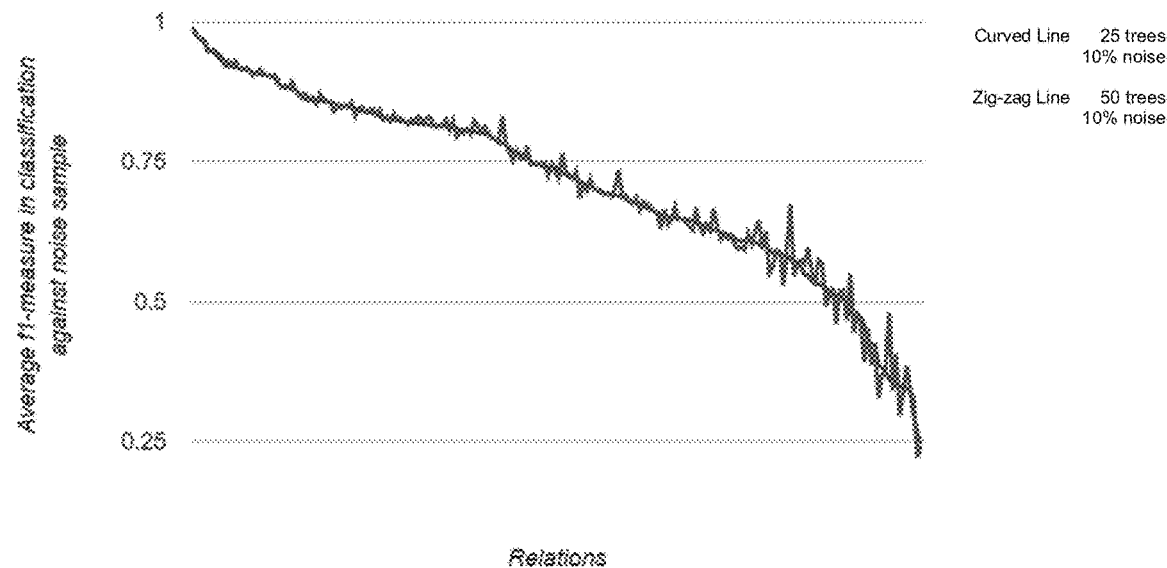
FIG. 6 shows an example plot of each triplet relation and its corresponding average f1-measures on questions against noise sample with $r_{noise}=10\%$ and different $n_{tree}$ values, in the embodiment of the classification analysis.

FIG. 6 plots each relations' average f1-measures on questions against noise sample with $r_{noise}=10\%$ and different $n_{tree}$ values. Still having more trees in the random forests does not provide a clear advantage. The differences have an average of −0.0022 and a standard deviation of 0.0210.

Figure 7:
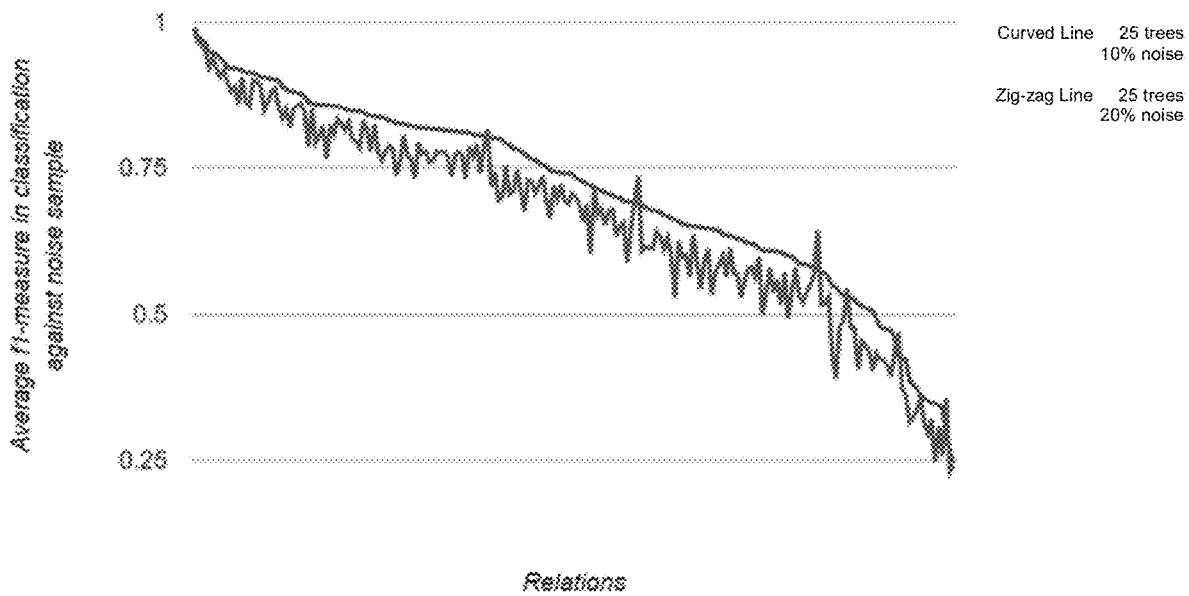
FIG. 7 shows an example plot of each triplet relation and its corresponding average f1-measures on questions against noise sample with $n_{tree}=25$ and different $r_{noise}$ values, in the embodiment of the classification analysis.

FIG. 7 plots each relations' average f1-measures on questions against noise sample with $n_{tree}=25$ and different $r_{noise}$ values. The average f1-measures drop slightly with the introduction of more data. One possibility would be that the random forests no longer have the capacity to handle the additional data. Or the additional noise samples reduce the distinguishability of the relations' questions. The differences have an average of 0.0312 and a standard deviation of 0.0472. This is not a significant change considering the number of negative instances is doubled in the classification task.

Figure 8:
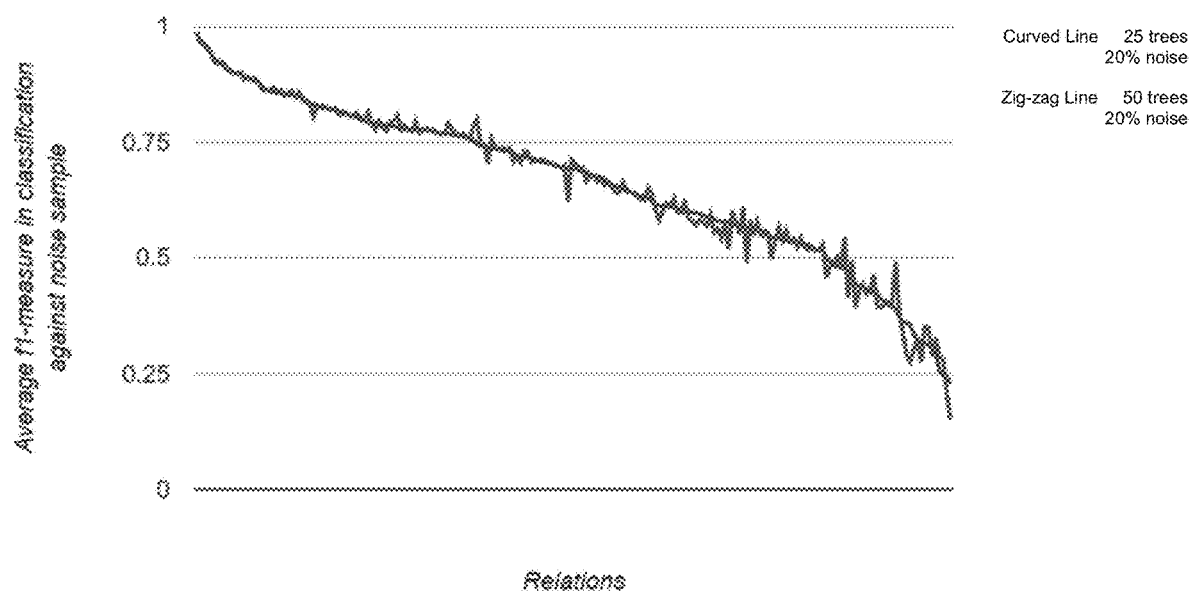
FIG. 8 shows an example plot of each triplet relation and its corresponding average f1-measures on questions against noise sample with $r_{noise}=20\%$ and different $n_{tree}$ values, in the embodiment of the classification analysis.

FIG. 8 plots each relation's average f1-measures on questions against noise sample with $r_{noise}=20\%$ and different $n_{tree}$ values. Doubling the number of trees in random forests does not differentiate the results much. The differences have an average of 0.0010 and a standard deviation of 0.0219. It shows that the slight decrease as seen in FIG. 4.6 is not a result of random forests not having enough capacity to handle the additional data.

Figure 9:
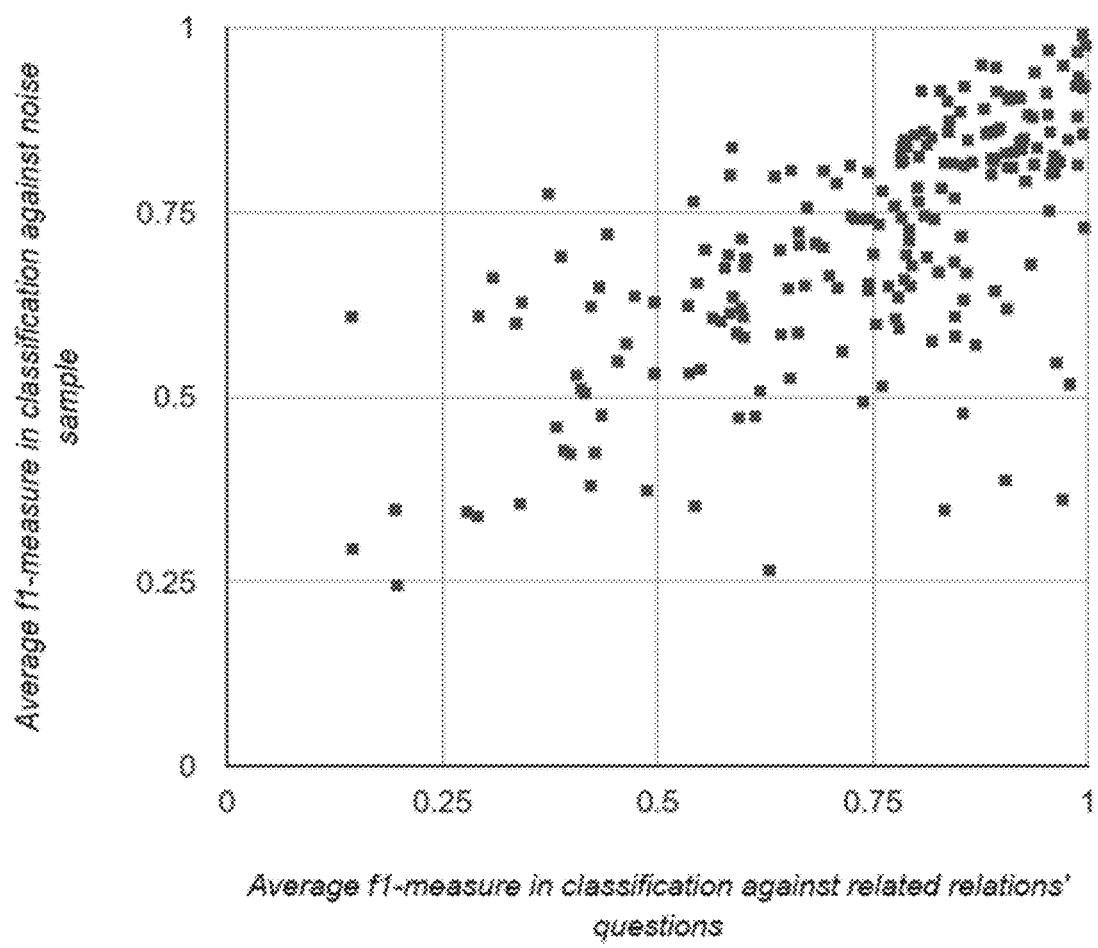
FIG. 9 shows an example plot of average f1-measures on questions against noise sample and on questions against related relations' questions with 25 trees and 10% noise sampling rate, in the embodiment of the classification analysis.

With $n_{tree}=25$ and $r_{noise}=10\%$, average f1-measure on questions against noise sample has a Pearson product-moment correlation coefficient of 0.68 with average f1-measure on questions against related relations' questions, showing that questions that are distinguish-able from noise do tend to be distinguishable from related relations' questions, yet there is not a strong correlation between the two. See FIG. 9.

With the same parameters, number of non-noise questions has a Pearson product-moment correlation coefficient of 0.49 with average f1-measure on questions against noise sample, and a Pearson product-moment correlation coefficient of 0.28 with average f1-measure on questions against related relations' questions. Number of positive instances has a weak correlation with average f1-measures.

For each relation, two classification models are trained without any hold-outs: its questions against noise sample, and its questions against related relations' questions. Given a threshold $\theta_{model}$, if the relation's either cross validation f1-measure is lower than $\theta_{model}$, the relation's classification models are discarded.

Question Parsing and Answering

In some embodiments, the question parsing and answering is the only online step.

To answer a question, the system first identifies the entity by pattern matching through the alias list which the system has compiled in "Question Pattern Extraction" above. If there is a match for alias a, a pair (a, $q_a$) is generated, where $q_a$ is the question with a stripped.

Then the system generates candidate answers from (a, $q_a$) and score them. Let e be the entity of which a is an alias. For every relation r that e has in the knowledge base, if the system retained r classification models, it fetches the triple (e, r, v) from the knowledge base, use v as a candidate answer, and assign the two probability outputs of the two classifiers as the scores of the candidate answer.

Finally the system ranks the candidate answers. Given a threshold $\theta_{answer}$, if either score of the candidate answer is lower than $\theta_{answer}$, the candidate answer is discarded. If there are at least one remaining candidates, they are ranked by the average of the two scores, and choose the one with the highest score as the answer.

For example, given $\theta_{answer}$=0.6, the process to answer question "道光是哪个皇帝 的年号？(Which emperor has the Chinese era name Daoguang?)" is as follows:

1. ("道光", "是哪个皇帝的年号？") and ("光", "道是哪个皇帝的年号？") are produced because aliases "道光" and "光" match the question.

2. 12 values from the knowledge bases are fetched and used as candidate answers. They are scored by invoking the classification models. ("道光", "是哪个皇帝的年号？") produces and scores 5 candidate answers while ("光", "道是哪个皇帝的年号？") produces and scores the other 7 candidate answers.

3. Only 1 candidate answer "清宣宗爱新觉罗旻宁 (Qing Xuanzong Aisin-Gioro Minning)" has scores both of which are higher than $\theta_{answer}$. It is produced by ("道光", "是哪个 皇帝的年号?") and has scores of 1.0 and 0.99.

4. The system produces an answer "清宣宗爱新觉罗旻宁 (Quin Xuanzong Aisin-Gioro Minning)", which is the correct answer to the question.

In the experiment environment (desktop PC), the system is able to answer the question correctly well within 1 second, despite doing hundreds of thousands of pattern matching, fetching 12 values from the knowledge base, and running 24 classification tasks.

Evaluation

First, the performance of the noise reduction component is evaluated (see "Noise Reduction" below). Then, the overall performance of system is evaluated along its two design goals:

The system should not answer questions that do not fall into the single-entity-single-relation category. Experiments were conducted to test the system's capability of opting for no answers when it should not answer the question (see "Answer Triggering" below).

The system should answer as many single-entity-single-relation questions as possible with reasonable accuracy. Experiments are conducted to test the system's capability of producing the right answers to questions across different relations (see "Question Coverage" below).

Finally, the run time performance of the system is evaluated (see "Run Time" below).

Noise Reduction

The noise reduction component is evaluated by examining the precision, recall, and f1-measure across different relations.

TABLE 1

Average precision, average recall, average f1-measure, and Pearson produce-moment correlation coefficient (Pearson's r) between f1-measure and number of extracted questions for different typed relations in noise reduction component.

| Relation Type | Average Precision | Average Recall | Average F1 | Pearson's r |
| --- | --- | --- | --- | --- |
| Any | 0.6424 | 0.7367 | 0.6800 | 0.0259 |
| Number | 0.6395 | 0.6058 | 0.6182 | 0.4099 |
| Entity | 0.6429 | 0.7613 | 0.6915 | −0.0055 |
| Date | 0.6416 | 0.6831 | 0.6554 | 0.2122 |

For each relation, 20 questions are randomly sampled with replacement: 10 from questions with non-noise label, and 10 from questions with noise label. Note that if there are fewer than 10 questions under certain label, all the questions are taken as the sample instead of sampling for 10 times. As a result, it is possible for relations to have fewer than 20 samples. Every sample is manually examined and labeled as noise or non-noise. Here human annotation is viewed as true label. Accordingly, the ratio of noise to non-noise is not 1:1. To be able to compare the f1-measure over different relations, weighting is used to balance the ratio of noise to non-noise to 1:1.

Among the 473 relations to which noise reduction is applied, 81 relations do not have any extracted questions without English words. 8 of them have "date" type, 8 of them have "number" type, and the rest 65 have "entity" type. Compared to their ratio in the 473 relations, "number" is more likely to have no extracted questions than "date" and "entity". As explained before, "number" values in DBPedia are much more accurate than how they appear in everyday conversations or casual online exchanges. Though the extractor is able to achieve approximation to some extent, in some circumstances it is still not enough. For example, the value of "人口 (population)" of "重庆市 (Chongqing)" is "28,846,170", while it is often mentioned as "3千万 (30 million)".

Another 211 relations do not have samples with "non-noise" true labels. Though it is possible that it is due to the relatively small sample size used in evaluation, it may be an accurate portrait of the noisy extracted data. For 130 (61.6%) relations, the noise reduction component successfully label all the questions as noise; and for the rest 38.4% relations, on average, the system misclassify 18.6% of the data as non-noise.

Table 1 shows the average precision, average recall, average f1-measure, and Pearson product-moment correlation coefficient (Pearson's r) between f1-measure and number of extracted questions for different typed relations in the rest 181 relations. Again, "number"-typed relations tend to under-perform. The low Pearson's r values show that f1-measure is not correlated with the number of extracted relations.

System Parameters

The system has four parameters, $n_{tree}$, $r_{noise}$, $\theta_{model}$, $\theta_{answer}$:

$n_{tree}$ is used to train the classification models in "Pattern Evaluation and Model Selection" above. It is the number of trees in random forests and is an inherent parameter of random forests. Higher values improves the performance of random forests for a diminishing return, but requires more computing power. It was tested on {25, 50}.

$r_{noise}$ is used to train the classification models in "Pattern Evaluation and Model Selection". It is the sampling rate of the noise sample used for model training. Higher values means more training data, but requires more computing power. It was tested on {10%, 20%}.

$\theta_{model}$, f1-measure threshold for model selection, is used to discard inadequate models in "Pattern Evaluation and Model Selection". An increase in value decreases the number of model the system uses and therefore decreases the number of relations that the system can identify. It was tested on {0.6, 0.7, 0.8, 0.9}.

$\theta_{answer}$, probability threshold for answer selection, is used to discard improbable answers in "Question Parsing and Answering" above. An increase in value decreases the number of answer candidates the system considers. It was tested on {0.6, 0.7, 0.8, 0.9}.

Configuration $n_{tree}$=25, $r_{noise}$=10%, $\theta_{model}$=0.6, $\theta_{answer}$=0.6 is the basic configuration as these are the most relaxed values for each parameters.

Answer Triggering

Answer triggering (Yang et al., 2015) is a task which requires QA systems to report no answers when given questions that are known to have no correct answers or beyond the knowledge of the systems. Traditionally QA systems are evaluated on question-answer data sets where each question has at least 1 correct answers. However, answer triggering is an important task. A system that excels in answer triggering understands the limitation of its knowledge and works well with other QA systems, each of which specializes or excels in certain domains. Meanwhile, a system that does extremely poor in answer triggering would attempt to answer almost every question and eventually produce much more incorrect answers.

The test cases were compiled by randomly sampling the community QA data. As when given a question, the system first uses pattern matching to identify the entities and does not proceed if no known entities are found in the question, to accurately assess the system in answer triggering, the test cases should have entities known to the system.

The test cases were gathered by the following steps:

1. Randomly sample aliases from relations known to the system. At the system's basic parameter configuration, it has models of 130 relations. For each relation, its entity list was expanded with the alias list compiled in "Question Pattern Extraction" above. Then 5 aliases were sampled from each of these relations, for a total of 650 aliases.

2. Query Solr, the storage system for community QA data, for questions that contain the aliases and randomly sample questions from the query results. 6 of the 650 aliases do not have any questions that mention them in community QA data, and a random sample of at most 5 is pulled for the rest 644 aliases. If the query result has fewer than 5 questions, they are all taken instead of sampling the result. In total, 2,689 questions were collected.

3. Label the questions as "single entity single relation" or not. 2,369 non-"single entity single relation" questions were used as the test case candidates.

4. In the 2,369 candidates, a total of 55 appear in the extracted questions. 46 are classified as noise: 11 of them are in the 10% noise sample, 17 of them are in the 20% noise sample, and 6 of them are in both noise samples. After excluding the candidates that are used to train the models, 2,338 test cases remain.

Figure 10:
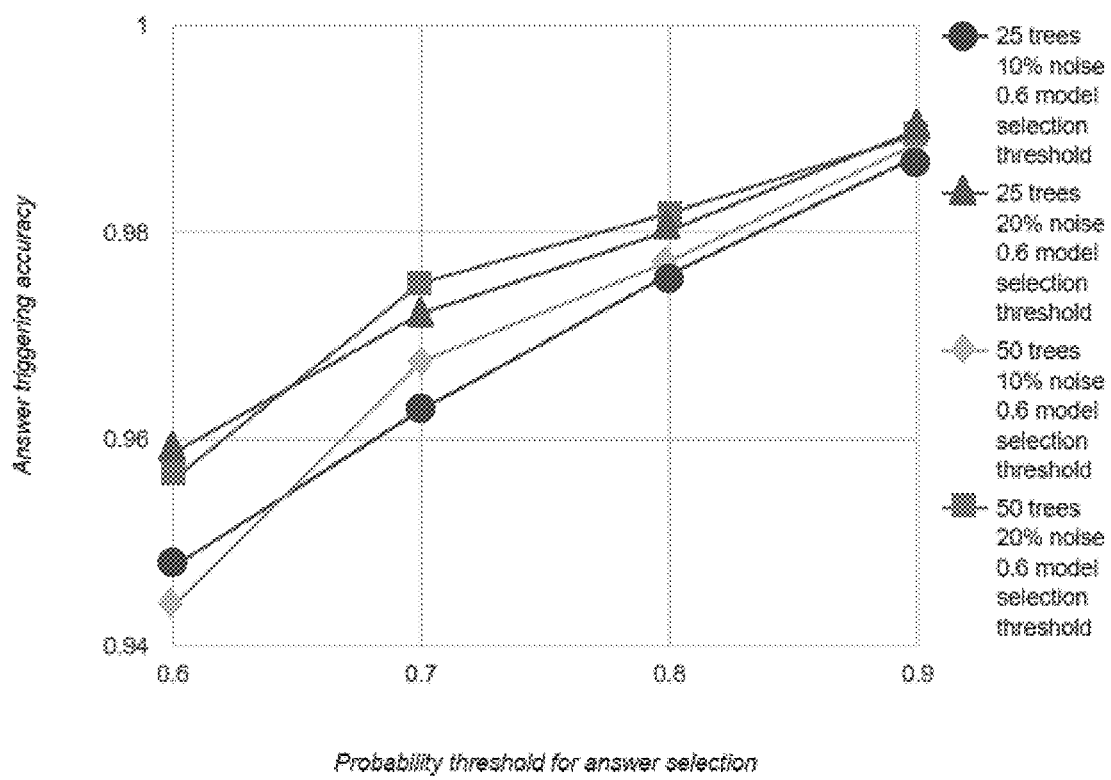
FIG. 10 shows an example plot of answer triggering accuracy and probability threshold for answer selection with different values of $n_{tree}$, $r_{noise}$, $\theta_{model}$, and $\theta_{answer}$, in an embodiment of the present system.
Figure 11:
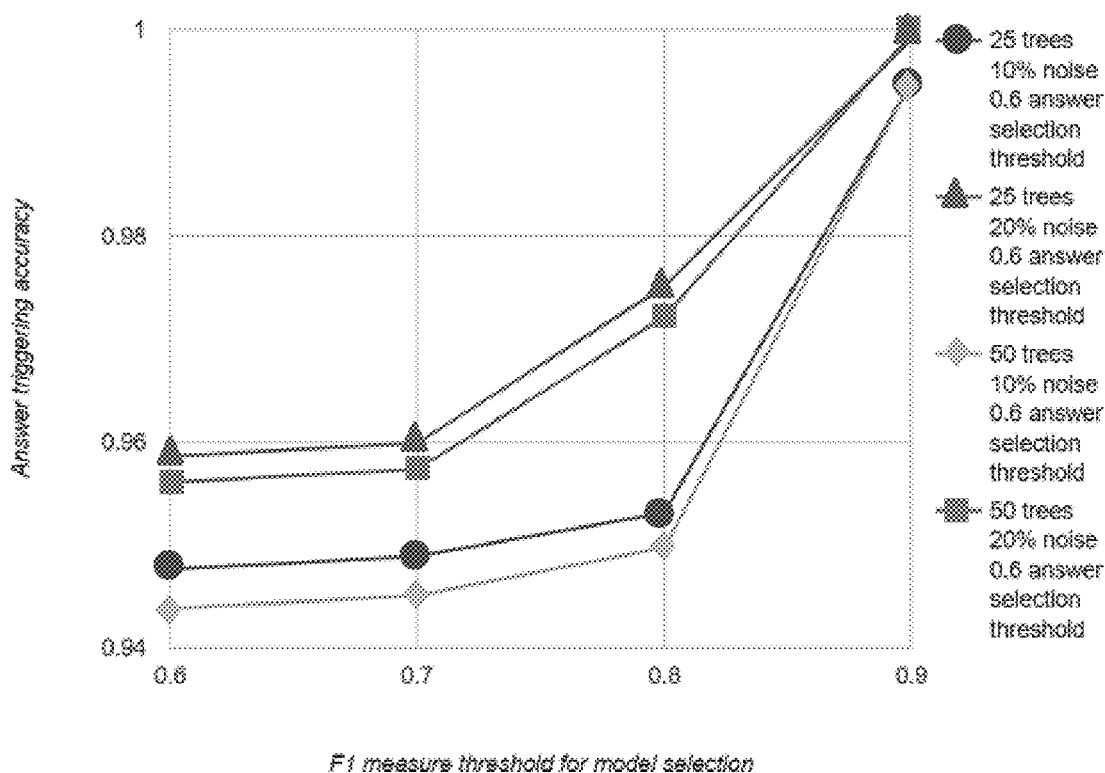
FIG. 11 shows an example plot of answer triggering accuracy and f1 measure threshold for model selection with different values of $n_{tree}$, $r_{noise}$, $\theta_{model}$, and $\theta_{answer}$, in the embodiment of the present system.

In the testing, the system declines to answer at least 94.4% non-"single entity single relation" questions. FIGS. 10 and 11 plots the accuracy in answer triggering task with different parameters. A higher $r_{noise}$, $\theta_{model}$, or $\theta_{answer}$ results in higher accuracy in answer triggering task.

Question Coverage

In "Answer Triggering" above, it was tested whether the system reject questions which it should not answer. Here the system is evaluated by testing whether it answers questions which it should answer correctly.

The test cases are generated by combining aliases with question patterns:

1. Begin with the 130 relations and 644 aliases in "Answer Triggering" above.

2. For each relation, have native Chinese speakers come up with questions patterns that are directly asking about the relation. The question patterns should apply to all the alias samples.

For example, let a be a placeholder for alias, for relation "配偶 (spouse)", questions patterns from the annotators include "a的老婆是谁？(Who's a's wife?)", "a的爱人 是谁？(Who's a's lover?)", "a 和谁结婚了？(Who's a married to?)", "a 娶了谁？(Who did a marry?)", etc.

In total the system has 279 question patterns from 124 relations. Six relations do not have question patterns: four of them have multiple relations mingled, and there lacks a common question pattern in Chinese for all the alias samples; and the last two, on close inspection, have obscure meanings.

3. Let r be one of the 124 relations, a be one of is sampled alias, and q be one of is question patterns, a QA pair is generated by replacing the alias placeholder in q with a and fetching a's DBpedia value on r.

For example, for relation "director", alias "角斗士 (Gladiator)", and patterns "a是谁 导演的？(Who directed a?)", "a 的导演是谁？(Who's the director of a?)", value is first fetchdd "雷利·史考特 (Ridley Scott)" from DBpedia, then generate two QA pairs: ("角斗士是谁导演的？(Who directed Gladiator?)", "雷利·史考特 (Ridley Scott)") and ("角斗士的导演是谁？(Who's the director of Gladiator?)", "雷利·史考特 (Ridley Scott)").

In total the system 1,395 QA pairs for 124 relations.

The performance of the system is compared to that of two retrieval-based systems, both of which are developed on the same community QA data set and return the original answer of a QA pair as answer:

Solr

The system use Solr to store the community QA data. Working as a search engine, it can be used for question answering. When used as a simple QA system, Solr ranks the QA pairs by the number of shared keywords between the query and its indexed questions. Then it selects the QA pair whose question shares the most words with the query, and returns the answer in the QA pair as the answer to the query.

TABLE 2

Statistics of SystemR, Solr, and basic configuration of the system on the QA test cases.

|  | SystemR | Solr | Basic configuration |
|---|---|---|---|
| Question Answered | 380 | 1,345 | 892 |
| Correct Answers | 39 | 60 | 781 |
| Accuracy on Answered Questions | 10.3% | 4.5% | 87.6% |
| Accuracy on Test Cases | 2.8% | 4.3% | 56.0% |
| Correct Answers on SystemR Correct Answers | 39 | 26 | 25 |
| Correct Answers on Solr Correct Answers | 26 | 60 | 38 |
| Relations with At Least One Correct Answers | 25 | 29 | 78 |
| Relations with At Least One Incorrect Answers | 98 | 124 | 34 |
| Relations with No Questions Answered | 23 | 0 | 35 |

Commercial QA System SystemR

There is access to a commercial QA system that is developed on the same community QA data set. For the sake of naming, it is referred to here as SystemR. SystemR has a search engine architecture similar to Solr. But instead of ranking QA pairs by the number of shared words between query and the question, SystemR ranks the QA pairs by the sentence similarity between query and the question. The similarity measure used by SystemR is a combination of weighted cosine similarity, overlap similarity, longest common substring, and word order similarity. If the similarity score is below certain threshold, SystemR declines to answer the question.

The answers of the two systems were manually examined for each of the 1,395 questions and label them "correct", "incorrect", or "missing answer", based on whether the systems give an answer and if they do, whether the answers have the same meaning as the DBpedia values in the test cases.

The answers from the system was marked automatically: answers that are exact matches of the DBpedia values are marked "correct", and the others are matched "incorrect" or "missing answer" depending on whether the system gives an answer or not.

Table 2 shows the performance of SystemR, Solr, and the system with the basic configuration at the test cases. Accuracy on Test Cases is calculated as Correct Answers/1395 (size of test cases), and Accuracy on Answered Questions is calculated as Correct Answers/Questions Answered.

The system comes at top in number of correctly answered questions, accuracy on answered questions, accuracy on test cases, and number of relations with at least 1 correctly answered questions. However, the system cannot identify the relation in any question of 35 relations. Also, even though the system gives much more correct answers, it cannot answer all the question which SystemR or Solr answers correctly.

The system's high accuracy on the test cases, 56.0% compared to SystemR's 2.8% and Solr's 4.3%, is largely attributed to the incorporation of structured knowledge base, and the separation of a question into entity and question pattern. Once the system learns a pattern for a relation, it can apply it to the relation's numerous entities and their aliases to answer numerous similar questions; meanwhile, for each newly acquired QA pair, retrieval-based systems like SystemR and Solr can learn to answer at most one new question. The system does not need to encounter the question during the system's development in order to answer the question, while retrieval-based systems do.

The system has very high accuracy on the answered questions, 87.6% compared to SystemR's 10.3% and Solr's 4.5%. For it to answer a question, the system needs to be able to recognize an entity and a matching relation in the question. Solr is a search engine, therefore as long as one of the QA pairs shares keywords with the query, Solr produces an answer. Even though SystemR also uses threshold to control its answer output, SystemR's similarity mechanisms fail to consider that two questions with the same pattern have totally different meaning if they have different entities in the questions. The entity in a question carries a weight disproportional of its length.

Table 3, Table 4, and Table 5 show how adjusting different parameters affect the system's performance on the test cases. $r_{noise}$, $\theta_{model}$, and $\theta_{answer}$ have similar effects: higher values result in fewer answered questions, lower accuracy on test cases, and higher accuracy on answered questions. The influence of $\theta_{model}$ is the most drastic, as it directly controls the number of classification models in the system. $n_{tree}$ has little effects on the performance, which corroborates similar observation in "Pattern Evaluation and Model Selection" above.

Run Time

The run time performance of the system was performed in a single-thread environment. Table 6 shows the average time per question it takes for the system to process all the 1,395 test cases with different parameter values. As $\theta_{answer}$ does not affect the processing time, it is not shown here.

In general, the system takes at most 19.89 milliseconds to answer a question. The fewer relations in the system, the lower the average time is. Overall, the system is shown to be a real-time QA system.

TABLE 3

Statistics of the system with $\theta_{model} = 0.6$, $\theta_{answer} = 0.6$ and different $n_{tree}$ and $r_{noise}$ values on the QA test cases.

|  | $n_{tree} = 25$, $r_{noise} = 0.1$ | $n_{tree} = 25$, $r_{noise} = 0.2$ | $n_{tree} = 50$, $r_{noise} = 0.1$ | $n_{tree} = 50$, $r_{noise} = 0.2$ |
|---|---|---|---|---|
| Question Answered | 892 | 832 | 879 | 836 |
| Correct Answers | 781 | 733 | 772 | 741 |
| Accuracy on Answered Questions | 87.6% | 88.1% | 87.8% | 88.6% |
| Accuracy on Test Cases | 56.0% | 52.5% | 55.3% | 53.1% |
| Correct Answers on SystemR Correct Answers | 25 | 23 | 25 | 24 |
| Correct Answers on Solr Correct Answers | 38 | 35 | 37 | 35 |
| Relations with At Least One Correct Answers | 78 | 73 | 76 | 73 |
| Relations with At Least One Incorrect Answers | 34 | 27 | 31 | 25 |
| Relations with No Questions Answered | 35 | 44 | 37 | 44 |

TABLE 4

Statistics of the system with $n_{tree} = 25$, $r_{noise} = 10\%$, $\theta_{answer} = 0.6$ and different $\theta_{model}$ values on the QA test cases.

| | $\theta_{model}$ | | | |
|---|---|---|---|---|
| | 0.6 | 0.7 | 0.8 | 0.9 |
| Question Answered | 892 | 746 | 554 | 100 |
| Correct Answers | 781 | 651 | 493 | 95 |
| Accuracy on Answered Questions | 87.6% | 87.3% | 89.0% | 95.0% |
| Accuracy on Test Cases | 56.0% | 46.7% | 35.3% | 6.8% |
| Correct Answers on SystemR Correct Answers | 25 | 19 | 14 | 3 |
| Correct Answers on Solr Correct Answers | 38 | 30 | 23 | 3 |
| Relations with At Least One Correct Answers | 78 | 59 | 42 | 9 |
| Relations with At Least One Incorrect Answers | 34 | 27 | 19 | 2 |
| Relations with No Questions Answered | 35 | 60 | 79 | 115 |

TABLE 5

Statistics of the system with $n_{tree}$ = 25, $r_{noise}$ = 10%, $\theta_{model}$ = 0.6 and different $\theta_{answer}$ values on the QA test cases.

| | $\theta_{answer}$ | | | |
|---|---|---|---|---|
| | 0.6 | 0.7 | 0.8 | 0.9 |
| Question Answered | 892 | 873 | 824 | 753 |
| Correct Answers | 781 | 765 | 728 | 667 |
| Accuracy on Answered Questions | 87.6% | 87.6% | 88.3% | 88.6% |
| Accuracy on Test Cases | 56.0% | 54.8% | 52.2% | 47.8% |
| Correct Answers on SystemR Correct Answers | 25 | 25 | 23 | 22 |
| Correct Answers on Solr Correct Answers | 38 | 38 | 37 | 35 |
| Relations with At Least One Correct Answers | 78 | 78 | 77 | 71 |
| Relations with At Least One Incorrect Answers | 34 | 34 | 31 | 28 |
| Relations with No Questions Answered | 35 | 35 | 38 | 45 |

TABLE 6

System's average run time per question and number of relations in the system with different $n_{tree}$, $r_{noise}$, $\theta_{model}$ values on the QA test cases.

| $n_{tree}$ | $r_{noise}$ | $\theta_{model}$ | Number of Relations | Average Time (ms) |
|---|---|---|---|---|
| 25 | 0.1 | 6 | 130 | 19.89 |
| 25 | 0.1 | 7 | 96 | 17.83 |
| 25 | 0.1 | 8 | 68 | 15.41 |
| 25 | 0.1 | 9 | 15 | 3.24 |
| 25 | 0.2 | 6 | 118 | 18.29 |
| 25 | 0.2 | 7 | 90 | 16.94 |
| 25 | 0.2 | 8 | 41 | 13.28 |
| 25 | 0.2 | 9 | 7 | 2.21 |
| 50 | 0.1 | 6 | 131 | 19.87 |
| 50 | 0.1 | 7 | 97 | 17.95 |
| 50 | 0.1 | 8 | 68 | 16.46 |
| 50 | 0.1 | 9 | 15 | 3.24 |
| 50 | 0.2 | 6 | 118 | 18.88 |
| 50 | 0.2 | 7 | 91 | 18.05 |
| 50 | 0.2 | 8 | 42 | 13.16 |
| 50 | 0.2 | 9 | 8 | 2.43 |

Discussion

Figure 12:
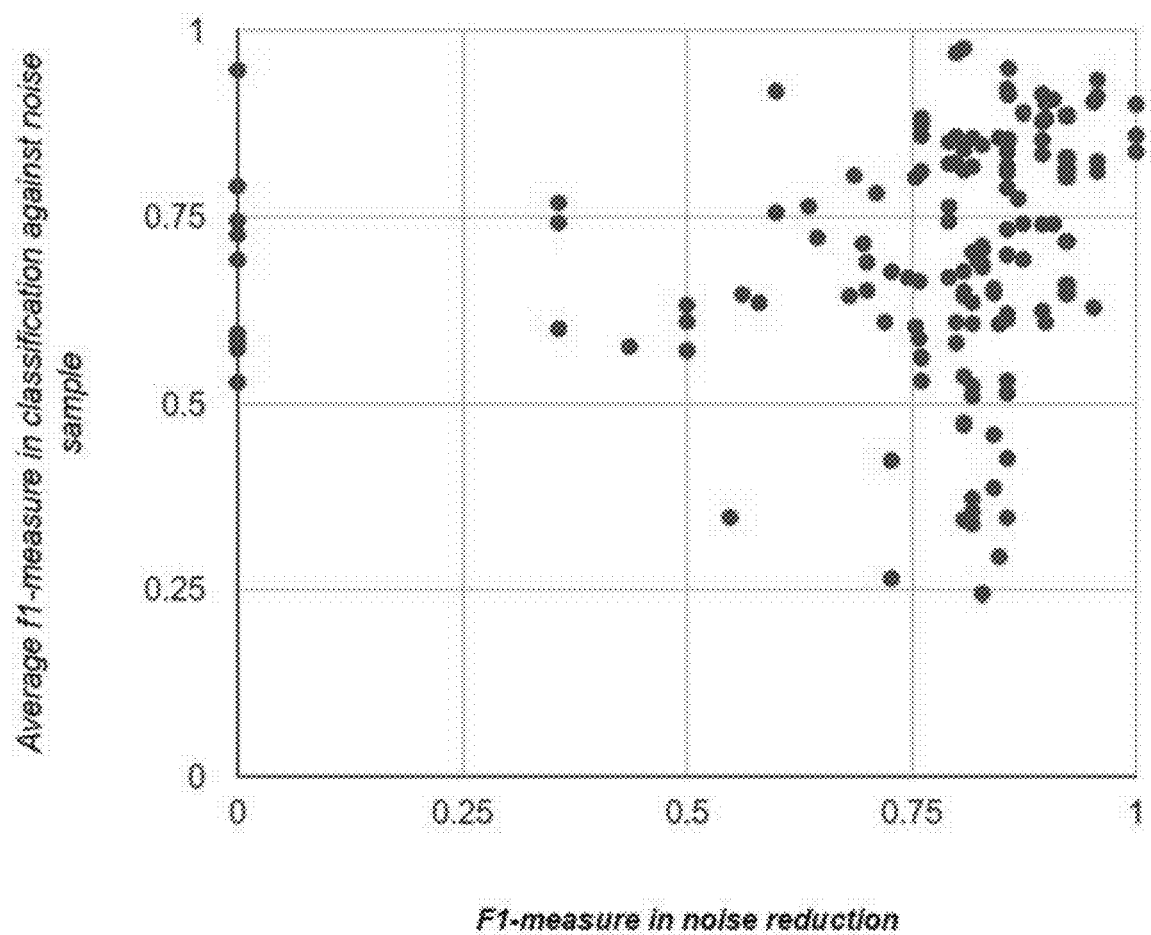
FIG. 12 shows an example plot of relations' f1-measure in noise reduction and average f1-measure in classification against 10% noise sample with 25 trees in random forests, in a second embodiment of the classification analysis.
Figure 13:
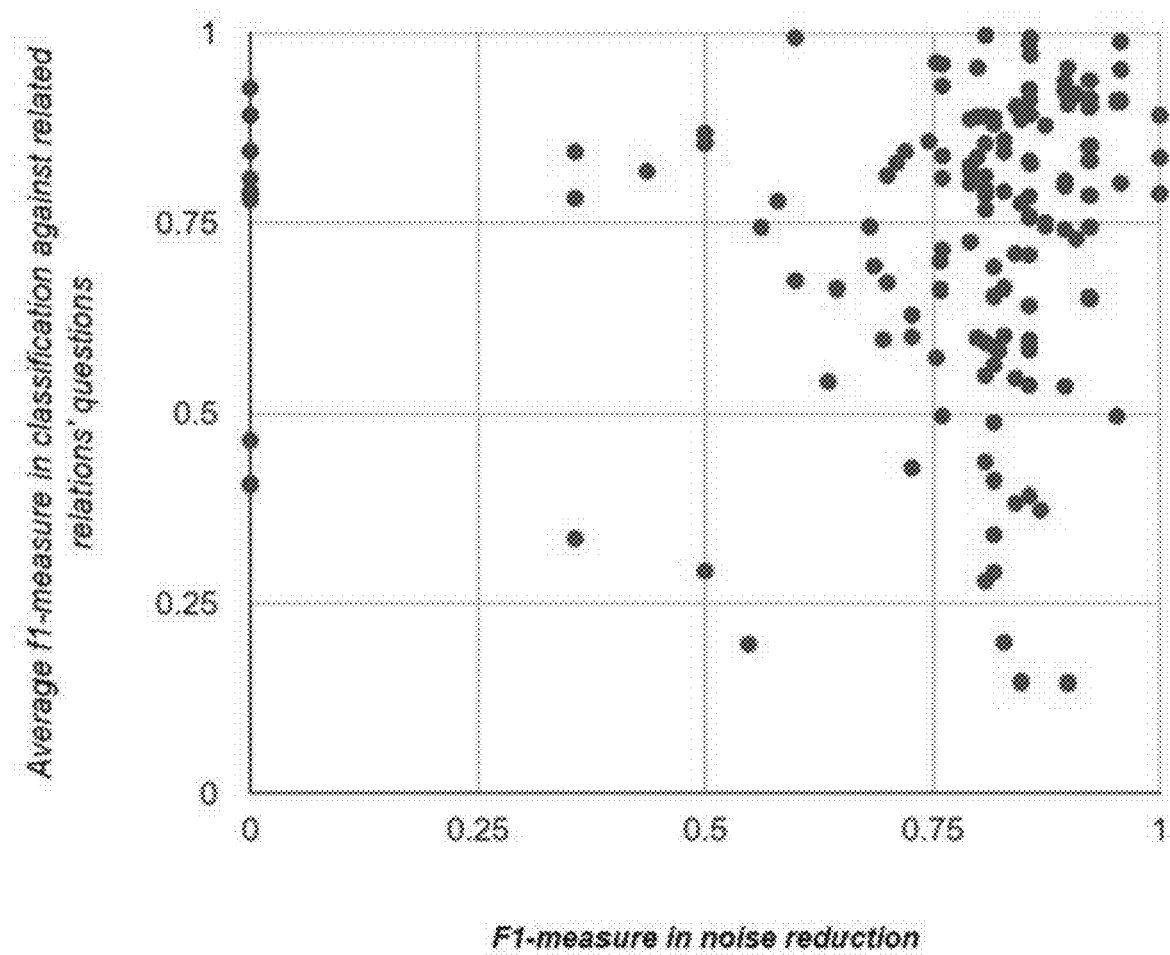
FIG. 13 shows an example plot of relations' f1-measure in noise reduction and average f1-measure in classification against related relations' questions with 25 trees in random forests, in the second embodiment of the classification analysis.

FIGS. 12 and 13 plot relations' f1-measure in noise reduction and average f1-measure in classification against related relations' questions and in classification against 10% noise sample, with 25 trees in random forests. The former measures the correctness of the labels in the classification models' training data, and the latter measures the separability of the training data. A higher percentage of correct labels in the training data is expected to correspond to better separability. However, it was observed that to the left there are relations with zero f1-measure in noise reduction yet very high f1-measure in classification tasks, and in the lower right there are relations with high f1-measure in noise reduction yet quite low f1-measure in classification tasks.

After examining these outliers, it was discover that the data of those with zero f1-measure in noise reduction consists of similar unrelated questions that are distinguishable. For example, "湖泊类别 (Lake type)" have 63.6% questions asking about "Which lake is the biggest e?", where e is the entity placeholder. These questions are introduced to the system by lakes which share the alias "淡水湖 (freshwater lake)" and have value "咸水湖 (saltwater lake)". Though the question pattern is not related to the relation and not even a single-entity-single-relation question, it is a valid question that is easily distinguishable from noise or other question patterns. The extraction process or noise reduction process can be further modified to eliminate these.

On the other hand, relations with high f1-measure in noise reduction yet low f1-measure in classification tasks suffer from the problem of inadequate instances. The four relations with the most disparity average 31 non-noise questions, while an average relation has 663 non-noise questions. The extraction process may be developed further to gather more questions, though it is also possible that the results are limited by the community QA data.

Figure 14:
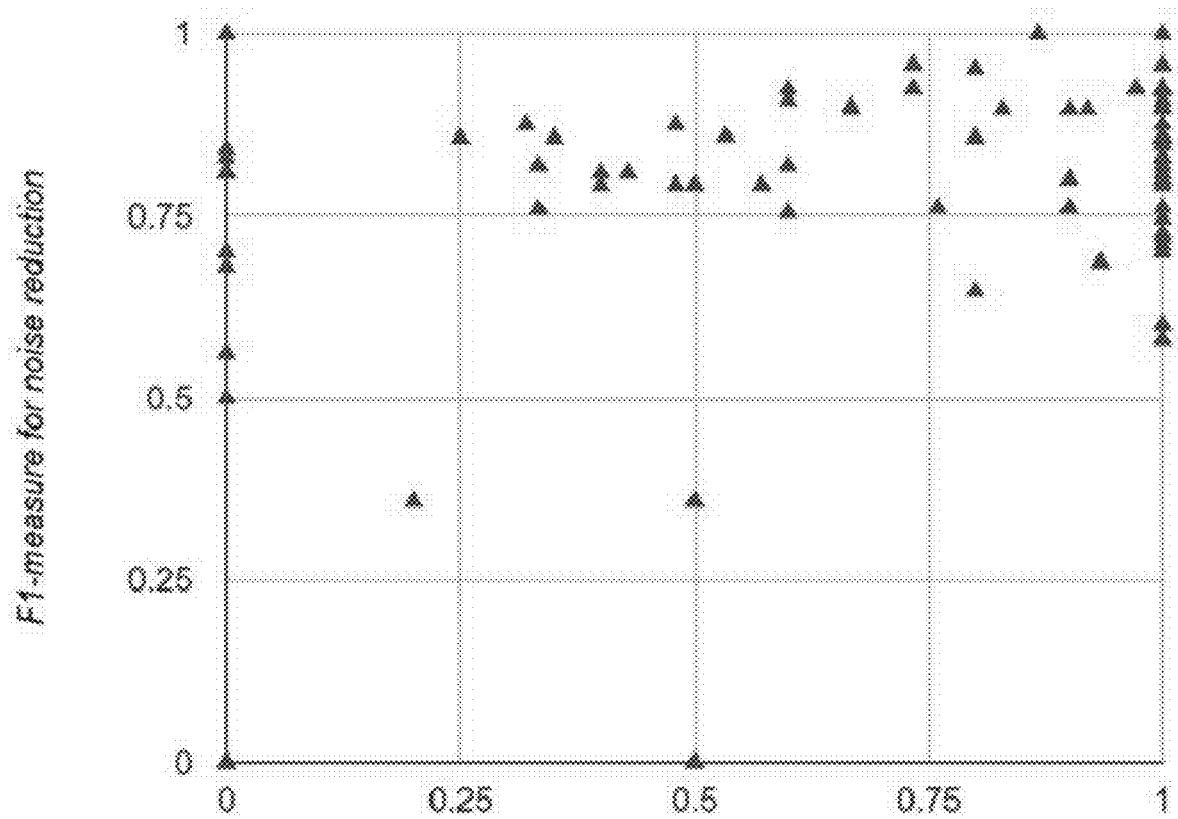
FIG. 14 shows an example plot of relations' accuracy on question coverage test cases at the basic configuration of the system and corresponding f1-measure on noise reduction, in the second embodiment of the classification analysis.

FIG. 14 plots relations' accuracy on question coverage test cases at the basic configuration of the system and corresponding f1-measure on noise reduction. The former measures the models' performance on the test cases, and the latter measures the correctness of the labels in the training data. Because the test cases are independent of the training data, no correlation is expected. Indeed the data points scatter around, with a Pearson product-moment correlation coefficient of 0.40 between noise reduction f1-measure and accuracy on test cases.

It is observed that there is an outlier, relation "主君 (master)", with a zero noise reduction f1-measure yet a non-zero accuracy on the QA test cases. On close inspection, it has a zero noise reduction f1-measure because random sampling fails to sample any truly non-noise questions. During the extraction process it is flooded with questions about the popular Chinese ancient novel "Romance of the Three Kingdoms", where the main characters have this relation with other main characters. As a result, many questions about the main characters find their way past the noise reduction process, making up the majority of questions with "non-noise" labeling.

Figure 15:
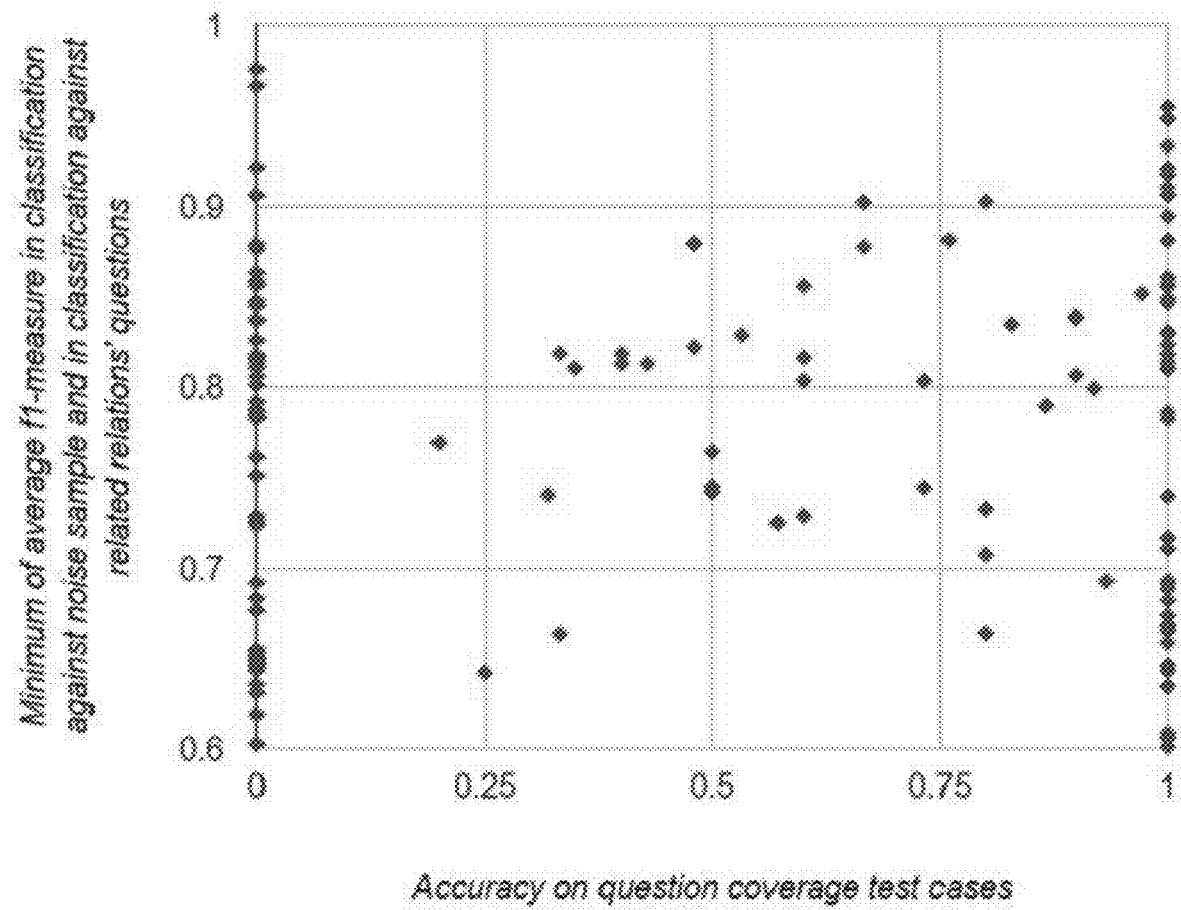
FIG. 15 shows an example plot of relations' accuracy on question coverage test cases at the basic configuration of the system and minimum of average f1-measure in classification against 10% noise sample and in related relations' questions with 25 trees in random forests, in the second embodiment of the classification analysis.

FIG. 15 plots relations' accuracy on question coverage test cases at the basic configuration of the system and minimum of average f1-measure in classification against related relations' questions and in classification against 10% noise sample, with 25 trees in random forests. The former measures the models' performance on the test cases, and the latter measures the models' performance in cross validation on training data. Again, because the test cases are independent of the training data, no correlation is expected between the two. Indeed, they have a Pearson product-moment correlation coefficient of 0.07.

In Table 6.1 is the system's performance data in answer triggering and question coverage tasks with different $n_{tree}$ and $r_{noise}$ values. The accuracy does not vary much. This shows that $n_{tree}$=25 is a sufficient number of decision trees in random forests, and that r=10% is a sufficiently large noise sampling rate.

Figure 16:
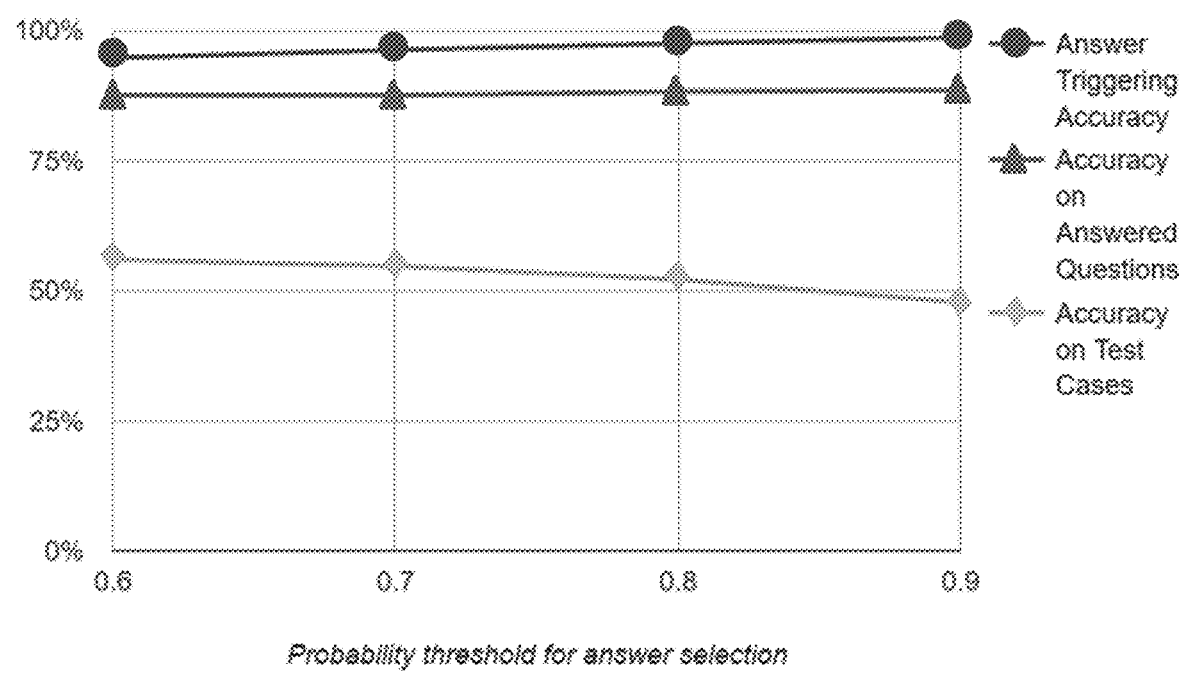
FIG. 16 shows an example plot of answer triggering and question coverage statistics of the system with $n_{tree}=25$, $r_{noise}=10\%$, $\theta_{model}=0.6$ and different $\theta_{answer}$ values, in a second embodiment of the present system.
Figure 17:
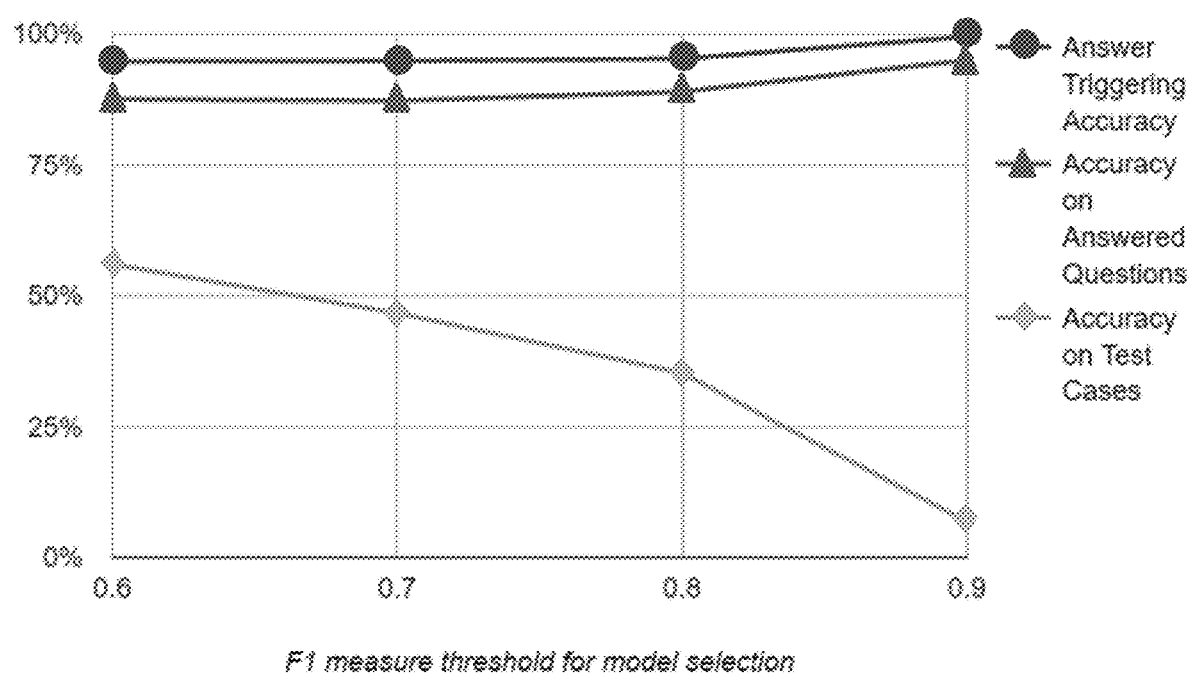
FIG. 17 shows an example plot of answer triggering and question coverage statistics of the system with $n_{tree}=25$, $r_{noise}=10\%$, $\theta_{model}=0.6$ and different $\theta_{answer}$ values, in the second embodiment of the present system.

In FIGS. 16 and 17 plot the effects of $\theta_{model}$ and $\theta_{answer}$ on the system's answer triggering accuracy, accuracy on answered questions, and accuracy on question coverage test cases. Most changes are smooth, except increasing $\theta_{model}$ drastically lowers the system's accuracy on question coverage test cases because higher $\theta_{model}$ values result in the fewer classification models in the system, thereby reducing the number of relations the system can identify.

TABLE 6.1

Answer triggering and question coverage statistics of our system with $\theta_{model} = 0.6$, $\theta_{answer} = 0.6$ and different $n_{tree}$ and $r_{noise}$ values.

|  | $n_{tree} = 25$, $r_{noise} = 0.1$ | $n_{tree} = 25$, $r_{noise} = 0.2$ | $n_{tree} = 50$, $r_{noise} = 0.1$ | $n_{tree} = 50$, $r_{noise} = 0.2$ |
|---|---|---|---|---|
| Answer Triggering Accuracy | 94.8% | 95.9% | 94.4% | 95.6% |
| Accuracy on Answered Questions | 87.6% | 88.1% | 87.8% | 88.6% |
| Accuracy on Test Cases | 56.0% | 52.5% | 55.3% | 53.1% |

What is claimed is:

1. A question and answer system for converting unlabeled data into structured and labeled data for answering one or more single-entity-single-relation questions, the system comprising:
   a non-transitory computer readable memory storing a library comprised of one or more data structures, each of the one or more data structures configured to store a plurality of extracted question arrays, wherein for each extracted question array said library of one or more data structures comprises:
      a first field identifying an entity of the extracted question array;
      a second field identifying a relation of the extracted question array; and
      a third field containing a labeled question; and
   a processor configured to:
      identify and import question and answer pairs from an user generated discussion platform;
      access a knowledge base comprised of a plurality of relation triples, wherein each relation triple comprises:
         an entity field;
         a relation field; and
         a value field;
      store the question of each question and answer pair in the library:
         when the entity field of at least one of the plurality of relation triples appear in the question,
         when the corresponding value field of the at least one of the plurality of relation triples appear in the corresponding answer, and
         when the corresponding value field do not appear in the question, wherein the question is stored as an extracted question array by storing the corresponding entity field as the first field, the corresponding relation field as the second field, and the corresponding question as the third field;
      receive as input a data string representing a posed question and output an answer to the posed question based on the extracted question arrays from the library; and
      remove mislabeled questions from the library by:
         converting the third fields containing the labeled question into vectors;
         projecting the vectors onto a multidimensional space;
         assigning the vectors into relation clusters by:
            identifying a core vector; and
            identifying edge vectors having distances within a predetermined first threshold value from the core vector; and
            discarding vectors and corresponding extracted question arrays that cannot be assigned to a cluster;
         wherein each relation cluster represents extracted question arrays having a common relation.

2. The system of claim 1, wherein the processor is configured to store the question as the extracted question array when the entity and value fields of only one relation triple appear the corresponding question and answer pair; and
   discard question and answer pairs that contain the entity and value fields of more than one relation triple.

3. The system of claim 1, comprising a search engine configured to identify candidate question and answer pairs for extraction by querying user generated discussion platforms using entity fields of knowledge bases and aliases to the entity fields, and the processor is configured to import the candidate question and answer pairs.

4. The system of claim 1, wherein the conversion of the third fields containing the labeled questions into vectors is executed by a neural network trained on the library of extracted question arrays, and wherein the neutral network is a recurrent neural network (RNN), comprising two layers of long short-term memory (LSTM) cells.

5. The system of claim 1, wherein assigning the vectors comprises iteratively identifying further edge vectors having distances within the predetermined first threshold value from the other previously identified vectors.

6. The system of claim 1, wherein the processor is configured to train a binary classifier for each relation cluster using the assigned vectors of each relation cluster, for classifying whether the posed question belongs a corresponding relation.

7. The system of claim 6, wherein the processor is configured to remove relation cluster by identifying overlapping first and second relation clusters, the first relation duster having first common relation, the second relation cluster having second common relation, when:

$$\frac{card(E(r_1) \cap E(r_2))}{card(E(r_2))}$$

is greater than or equal to a ratio threshold,
   where $E(r_1)$ represents a set of entities associated with the first common relation,
   where $E(r_2)$ represents a set of entities associated with the second common relation,
   where $card(E(r_2))$ represents the number of entities in $E(r_2)$, and
   where $card(E(r_1) \cap E(r_2))$ represents the number of common entities between $E(r_1)$ and $E(r_2)$.

8. The system of claim 7, wherein the ratio threshold is between 0.1 and 0.2.

9. The system of claim 7, wherein when the first and second relation clusters are identified as overlapping, the processor is configured to:
   obtaining a first relevancy score for the first relation cluster and a second relevancy score for the second relation cluster, wherein the relevancy scores are f1-measures of the binary classifiers; and
   discarding one of the first or second relation cluster having the lower relevancy score, when the lower relevancy score is below a second threshold value.

10. The system of claim 9, wherein the second threshold value is between 0.5 and 0.9.

11. The system of claim 10, wherein the second threshold value is 0.7.

12. The system of claim 9, comprising a named-entity recognizer; and wherein the processor is configured to output the answer to the posed question by:
classifying the posed question to a relation cluster using the trained binary classifiers;
selecting the common relation associated with the relation cluster;
identifying the entity of the posed question using the named-entity recognizer;
searching the knowledge base for a relation triple having said common relation and said entity in the relation and entity fields, respectively; and
outputting as the answer to the posed question the value field of said relation triple.

13. The system of claim 1, wherein the data string representing the posed question comprises an audio input data converted into a text data string, and wherein the answer to the posed question is represented by an audio output feed.

14. A method for converting unlabeled data into structured and labeled data for answering one or more single-entity-single-relation questions, the method comprising the steps of:
identifying and importing question and answer pairs from an user generated discussion platform;
accessing a knowledge base comprised of a plurality of relation triples, wherein each relation triple comprises:
an entity field;
a relation field, and
a value field;
storing the question of each question and answer pair in a library:
when the entity field of at least one of the plurality of relation triples appear in the question,
when the corresponding value field of the at least one of the plurality of relation triples appear in the corresponding answer, and
when the corresponding value field do not appear in the question,
wherein the library comprises of one or more data structures, each of the one or more data structures configured to store a plurality of extracted question arrays, wherein for each extracted question array said library of one or more data structures comprises:
a first field identifying an entity of the extracted question array,
a second field identifying a relation of the extracted question array, and
a third field containing a labeled question,
wherein the question is stored as an extracted question array by storing the corresponding entity field as the first field, the corresponding relation field as the second field, and the corresponding question as the third field;
receiving as input a data string representing a posed question and output an answer to the posed question based on the extracted question arrays from the library; and
removing mislabeled questions from the library by:
converting the third fields containing the labeled questions into vectors;
projecting the vectors onto a multidimensional space;
assigning the vectors into relation clusters by:
identifying a core vector; and
identifying edge vectors having distances within a predetermined first threshold value from the core vector; and
discarding vectors and corresponding extracted question arrays that cannot be assigned to a cluster;
wherein each relation cluster represents extracted question arrays having a common relation.

15. The method of claim 14, comprising storing the question as the extracted question array when the entity and value fields of only one relation triple appear the corresponding question and answer pair; and
discarding question and answer pairs that contain the entity and value fields of more than one relation triple.

16. The method of claim 14, comprising identifying candidate question and answer pairs for extraction by querying user generated discussion platforms using entity fields of knowledge bases and aliases to the entity fields, and the processor is configured to import the candidate question and answer pairs.

17. The method of claim 14, wherein converting the third fields containing the labeled questions into vectors is executed by a neural network trained on the library of extracted question arrays, and wherein the neutral network is a recurrent neural network (RNN), comprising two layers of long short-term memory (LSTM) cells.

18. The method of claim 14, wherein assigning the vectors comprises iteratively identifying further edge vectors having distances within the predetermined first threshold value from the other previously identified vectors.

19. The method of claim 14, comprising training a binary classifier for each relation cluster using the assigned vectors of each relation duster, for classifying whether the posed question belongs a corresponding relation.

20. The method of claim 19, comprising removing relation cluster by identifying overlapping first and second relation clusters, the first relation cluster having first common relation, the second relation cluster having second common relation, when:

$$\frac{card(E(r_1) \cap E(r_2))}{card(E(r_2))}$$

is greater than or equal to a ratio threshold,
where $E(r_1)$ represents a set of entities associated with the first common relation,
where $E(r_2)$ represents a set of entities associated with the second common relation,
where $card(E(r_2))$ represents the number of entities in $E(r_2)$, and
where $card(E(r_1) \cap E(r_2))$ represents the number of common entities between $E(r_1)$ and $E(r_2)$,
identifying an overlapping first and second relation cluster;

obtaining a first relevancy score for the first relation cluster and second relevancy score for the second relation duster, selecting the lower of the first and second relevancy score;

discarding the first relation cluster if the lower relevancy score is below a second threshold value wherein the relevancy scores are f1-measures the binary classifiers.

21. The method of claim 20, wherein the ratio threshold is between 0.1 and 0.2.

22. The method of claim 20, wherein when the first and second relation clusters are identified as overlapping, the method comprises:

obtaining a first relevancy score for the first relation cluster and a second relevancy score for the second relation cluster, wherein the relevancy scores are f1-measures of the binary classifiers; and discarding one of the first or second relation cluster having the lower relevancy score, when the lower relevancy score is below a second threshold value.

23. The method of claim 22, wherein the second threshold value is between 0.5 and 0.9.

24. The method of claim 23, wherein the second threshold value is 0.7.

25. The method of claim 22, comprising outputting the answer to the posed question by:

classifying the posed question to a relation cluster using the trained binary classifiers;

selecting the common relation associated with the relation cluster;

identifying the entity of the posed question using a named-entity recognizer;

searching the knowledge base for a relation triple having said common relation and said entity in the relation and entity fields, respectively; and outputting as the answer to the posed question the value field of said relation triple.

26. The method of claim 14, wherein the data string representing the posed question comprises an audio input data converted into a text data string, and wherein the answer to the posed question is represented by an audio output feed.

27. A non-transitory computer-readable medium comprising code for carrying out a method comprising:

identifying and importing question and answer pairs from an user generated discussion platform;

accessing a knowledge base comprised of a plurality of relation triples, wherein each relation triple comprises:
an entity field;
a relation field, and
a value field;

storing the question of each question and answer pair in a library:

when the entity field of at least one of the plurality of relation triples appear in the question, when the corresponding value field of the at least one of the plurality of relation triples appear in the corresponding answer, and when the corresponding value field do not appear in the question, wherein the library comprises of one or more data structures, each of the one or more data structures configured to store a plurality of extracted question arrays, wherein for each extracted question array said library of one or more data structures comprises:

a first field identifying an entity of the extracted question array, a second field identifying a relation of the extracted question array, and a third field containing a labeled question, wherein the question is stored as an extracted question array by storing the corresponding entity field as the first field, the corresponding relation field as the second field, and the corresponding question as the third field;

receiving as input a data string representing a posed question and output an answer to the posed question based on the extracted question arrays from the library; and removing mislabeled questions from the library by:

converting the third fields containing the labeled questions into vectors;

projecting the vectors onto a multidimensional space;

assigning the vectors into relation clusters by:
identifying a core vector; and
identifying edge vectors having distances within a predetermined first threshold value from the core vector; and discarding vectors and corresponding extracted question arrays that cannot be assigned to a cluster;

wherein each relation cluster represents extracted question arrays having a common relation.

* * * * *